US011250063B2

(12) United States Patent
Krasadakis

(10) Patent No.: US 11,250,063 B2
(45) Date of Patent: Feb. 15, 2022

(54) CLOSED-LOOP NATURAL LANGUAGE QUERY PRE-PROCESSOR AND RESPONSE SYNTHESIZER ARCHITECTURE

(71) Applicant: Accenture Global Solutions Limited, Dublin (IE)

(72) Inventor: Georgios Krasadakis, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 79 days.

(21) Appl. No.: 16/274,959

(22) Filed: Feb. 13, 2019

(65) Prior Publication Data

US 2019/0179856 A1 Jun. 13, 2019

Related U.S. Application Data

(62) Division of application No. 15/357,574, filed on Nov. 21, 2016, now Pat. No. 10,275,539.

(51) Int. Cl.
| | | |
|---|---|---|
| *G06F 16/9032* | (2019.01) | |
| *G06F 16/9038* | (2019.01) | |
| *G10L 13/00* | (2006.01) | |
| *G06F 40/30* | (2020.01) | |
| *G06F 40/295* | (2020.01) | |
| *G06F 40/237* | (2020.01) | |
| *G10L 15/18* | (2013.01) | |
| *G10L 15/22* | (2006.01) | |
| *G10L 15/00* | (2013.01) | |

(52) U.S. Cl.
CPC .... *G06F 16/90332* (2019.01); *G06F 16/9038* (2019.01); *G06F 40/237* (2020.01); *G06F 40/295* (2020.01); *G06F 40/30* (2020.01); *G10L 13/00* (2013.01); *G10L 15/1822* (2013.01); *G10L 15/22* (2013.01); *G10L 15/00* (2013.01)

(58) Field of Classification Search
CPC ..... G10L 13/00; G10L 15/1822; G10L 15/22; G10L 15/00; G06F 40/20; G06F 40/295; G06F 16/90332; G06F 16/9038; G06F 40/30
USPC .......................................................... 707/722
See application file for complete search history.

(56) References Cited

U.S. PATENT DOCUMENTS

| | | | | |
|---|---|---|---|---|
| 7,606,714 B2* | 10/2009 | Williams | ............... | G10L 13/027 704/275 |
| 7,702,508 B2* | 4/2010 | Bennett | ................... | G06F 40/20 704/257 |
| 9,922,642 B2* | 3/2018 | Pitschel | ................ | G10L 15/063 |
| 2001/0053968 A1* | 12/2001 | Galitsky | ................ | G06F 16/38 704/9 |
| 2008/0215975 A1 | 9/2008 | Harrison et al. | | |

(Continued)

*Primary Examiner* — Kuen S Lu
(74) *Attorney, Agent, or Firm* — Crowell & Moring LLP

(57) ABSTRACT

A closed-loop natural language query pre-processor and response synthesizer architecture accepts natural language queries and dynamically synthesizes query results. The query results may be in the form of data stories. The architecture identifies, selects, and composes candidate response elements into a coherent and meaningful query result. The architecture also implements an adaptable delivery mechanism that is responsive to connection bandwidth, query source preferences, query source characteristics, and other factors. Feedback from multiple sources adapts the architecture for handling subsequent queries.

26 Claims, 15 Drawing Sheets

(56) References Cited

U.S. PATENT DOCUMENTS

| | | | |
|---|---|---|---|
| 2009/0089044 A1* | 4/2009 | Cooper | G06F 40/30 |
| | | | 704/9 |
| 2010/0030647 A1* | 2/2010 | Shahshahani | G06Q 30/0269 |
| | | | 705/14.66 |
| 2010/0280641 A1 | 11/2010 | Harkness et al. | |
| 2012/0166180 A1 | 6/2012 | Au | |
| 2014/0075004 A1* | 3/2014 | Van Dusen | G06F 16/90335 |
| | | | 709/223 |
| 2015/0317318 A1* | 11/2015 | Hadzhiyski | G06F 16/90332 |
| | | | 707/752 |
| 2016/0048561 A1* | 2/2016 | Jones | G06F 16/24578 |
| | | | 707/722 |
| 2016/0134577 A1* | 5/2016 | Owens | H04L 67/22 |
| | | | 709/206 |
| 2017/0193057 A1* | 7/2017 | Yi | G06N 20/00 |
| 2018/0089191 A1* | 3/2018 | Obasanjo | G06F 16/334 |

* cited by examiner

Question: "Are sales on track for product A in territory X?"

① The system identified the product, the metrics to analyze (sales) against time, the territory, the time frame. Also identified and used seasonal adjustment. Used 'Although' to start the story.

② The system automatically projects the KPIs against the budget (sales & financial targets) of the user and team. Enterprise data indicates that the end of the fiscal period is approaching and that the user frequently accesses performance vs. budget data.

Answer: "Although product A sales have dropped 22% in territory X during the last 3 months, the season-adjusted sales have gone up by 5%. Based on this rhythm you will certainly hit your personal and team targets. Important to notice that company Z has launched a directly competing product K with rapid sales growth of 34%. Social media discussions indicate a direct comparison between product A and product K. Consumer sentiment analysis is in favor of your product by 15%. Also, today's News cover is the launch of the competitive product – I have prepared a summary for you here ③ The system takes action triggered by competition analysis. Data elements reveal competitors, market shares and products, press reports, and content (article, news, videos, social posts) related to competition.

The system takes further action – triggered by the competitor activity – and uses scanned content from major media sites, in reference to the new product by the competitor. Can provide an automatically compiled summary of the articles and/or entry points to the actual content.

④ Triggered by the competitive product launch, the system uses social feeds to capture related social discussions across major social media platforms.

⑤ Given the significant presence in social media feeds, the system further utilizes sentiment analysis to compare what is being said for the two products. Uses the high-level results as part of the story.

Figure 8

| 1300 ↗ | | | Relevance 1302 | | | | Expected Engagement 1304 | | | |
|---|---|---|---|---|---|---|---|---|---|---|
| Element 1309 | T: S-Type 1310 | Question 1316 | User 1318 | Time & Fiscal 1320 | Adjusted 1312 | Internal 1322 | External 1324 | Adjusted 1314 | Rank 1308 |
| BBC: mentioned in the news. | Content: News Mention | 0.75 | 0.99 | 0.18 | 0.86 | 0.81 | 0.70 | 0.76 | 0.81 |
| Sales Volume Trend, Broken by product | Data: KPI | 0.92 | 0.86 | 0.75 | 0.86 | 0.72 | 0.54 | 0.63 | 0.75 |
| Customer Satisfaction Trend | Data: Time Series | 0.41 | 0.95 | 0.90 | 0.84 | 0.68 | 0.97 | 0.83 | 0.83 |
| Competitor's Related Patent Published | Content: News Patent | 0.79 | 0.93 | 0.11 | 0.82 | 0.42 | 0.37 | 0.40 | 0.61 |
| Product Quality Index | Data: KPI | 0.47 | 0.92 | 0.19 | 0.76 | 0.32 | 0.55 | 0.44 | 0.60 |
| MIT: Research on a new technology | Content: News | 0.64 | 0.60 | 0.32 | 0.64 | 0.65 | 0.24 | 0.45 | 0.54 |
| Facebook: Competitor product release | Content: News | 0.64 | 0.60 | 0.86 | 0.63 | 0.80 | 0.23 | 0.52 | 0.57 |
| Wired: Competitor X, new patent | Content: News Tech | 0.91 | 0.60 | 0.30 | 0.63 | 0.62 | 0.70 | 0.66 | 0.65 |
| Team Targets | Data: Business Activity | 0.34 | 0.69 | 0.43 | 0.59 | 1.00 | 0.32 | 0.66 | 0.63 |
| Market Share | Data: KPI | 0.99 | 0.42 | 0.89 | 0.58 | 0.63 | 0.49 | 0.56 | 0.57 |
| BBC: Product X released today | Content: News | 0.19 | 0.75 | 0.03 | 0.57 | 0.80 | 0.57 | 0.69 | 0.63 |
| Team Budget (target / goals / objective) | Data: Business Activity | 0.97 | 0.25 | 0.91 | 0.46 | 0.44 | 0.82 | 0.63 | 0.55 |
| ... | | | | | | | | | |
| Corporate Revenue | Data: KPI | 0.20 | 0.02 | 0.35 | 0.09 | 0.25 | 0.92 | 0.59 | 0.34 |

Figure 13

CLOSED-LOOP NATURAL LANGUAGE QUERY PRE-PROCESSOR AND RESPONSE SYNTHESIZER ARCHITECTURE

CROSS REFERENCE TO RELATED APPLICATION

This application is a divisional of U.S. application Ser. No. 15/357,574, filed Nov. 21, 2016, the entirety of which is incorporated by reference.

TECHNICAL FIELD

This disclosure relates to complex processing of natural language queries to generate more accurate, relevant, engaging, contextually relevant, and personalized query responses.

BACKGROUND

The processing power, network bandwidth, available storage space, and other resources available to computing systems have increased exponentially in recent years. Advances in storage technologies, both local and cloud-based, have led to the capture, storage, and retention of immense quantities of information in a globally distributed manner. It is a significant technical challenge to intelligently process queries against these immense data stores and deliver results that are actually meaningful.

BRIEF DESCRIPTION OF THE DRAWINGS

FIG. 8 shows example processing performed by the architecture on a natural language query.

FIG. 13 shows an example of a multi-dimensional analysis framework.

DETAILED DESCRIPTION

Figure 1:
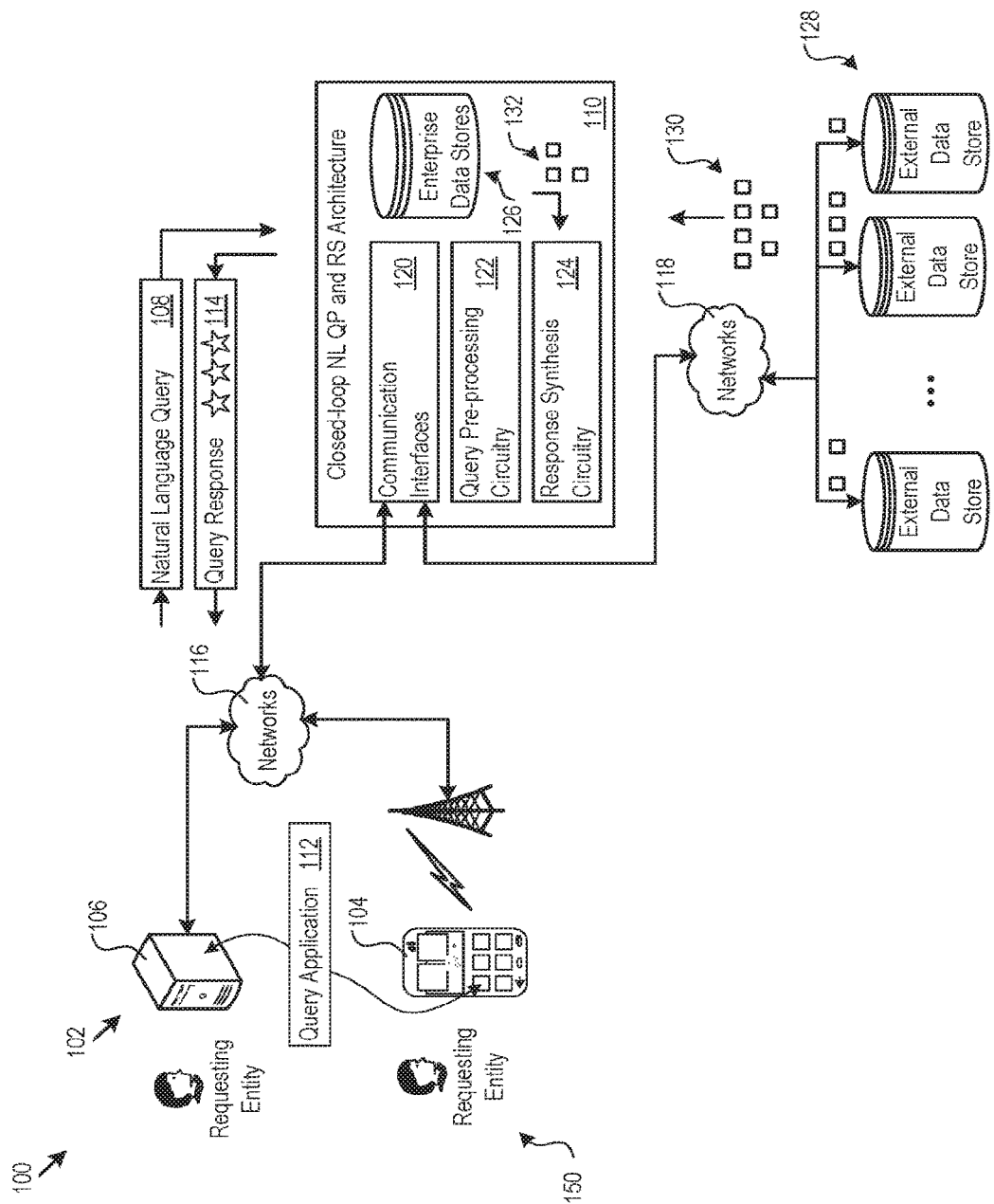
FIG. 1 shows network connected entities communicating with a closed-loop natural language query pre-processor and response synthesizer architecture.

A closed-loop natural language query pre-processor and response synthesizer architecture ("architecture") accepts natural language queries and dynamically synthesizes query results. The query results may be in the form of data stories, as just one example. The architecture identifies, selects, and composes candidate response elements into a coherent and meaningful query result, e.g., a data story. The architecture also implements an adaptable delivery mechanism that is responsive to requesting entity characteristics and preferences, connection bandwidth, query source preferences and characteristics, and other factors. The architecture may also be responsive to state and dynamics information that captures or represents the dynamics of the requesting entity within its environment. For instance, the state information may capture the entity role within the enterprise, current performance metrics, and target performance metrics in connection with approaching year-end bonuses. Closed-loop feedback from multiple sources adapts the architecture for improved handling of subsequent queries. An example query source is a smartphone, and an example requesting entity is an enterprise engineer who submits the natural language query via the smartphone.

In one implementation, the overall architecture includes a Natural Language Query Pre-processing Architecture ("QPA") and a response synthesizer architecture ("RSA"). The QPA accepts input queries in the form of natural language statements. The QPA extracts and verifies the structure of the input query and identifies the entities involved explicitly and implicitly with the input query. For valid input queries, the QPA searches for and retrieves meaningful candidate response elements from a pre-defined set of data stores (whether internal, external, or both), responsive to the pre-processing the QPA has performed on the input query. The QPA provides the candidate response elements to the RSA.

The RSA ranks, filters, selects, and composes candidate response elements into a coherent and meaningful query result. The QPA located the candidate response elements from searching and identifying relevant data elements in a pre-defined set of data stores, responsive to a pre-processed natural language query. The RSA filters the candidate response elements to select a sub-set to include in the query response. The RSA may deliver the query response in many different forms, with composition and delivery of the query response responsive to: connection bandwidth; querying entity preferences, state, dynamics, and characteristics; query source preferences and characteristics; and other factors.

The architecture implements technical solutions to many difficult technical problems in the field of automatically generating meaningful query responses given extensive and impossible to manually search data stores of potentially relevant information. A few examples of the technical solutions are summarized next. The architecture provides a personalized mechanism for answering questions, responsive, as examples, to: the role and perspective of the person asking the question; timing considerations; context; session history, including prior queries and responses, query and response history from others with similar characteristics to the querying entity, such as other enterprise engineers or managers; and other factors. The architecture may also identify explicitly and implicitly referenced entities in the input query and use the identified entities in its search for candidate response elements.

The architecture also implements query prediction to determine, in advance, likely subsequent queries to follow, given a starting input query or sequence of input queries and contexts. The architecture understands which metrics, key performance indicators (KPIs), and other data are relevant to the substance of the input query, responsive to configurable ontologies and other models whose content provides a pre-defined context for the substance of the input query. For instance, the context may describe a particular enterprise, its markets, its products, workflows, metrics, and its enterprise activities.

The architecture also identifies the type of question asked in the input query, and correlates the input query and candidate response elements with enterprise activities, targeting, planning, and other goals. The technical solutions in the architecture further identify the time frame of reference in the input query, its positioning within, e.g. a pre-defined fiscal year for the enterprise or competitor enterprises, and other timing data. The architecture responds to enterprise structural data, e.g., organizational structures, and enterprise dynamics to differentiate the query responses. The technical implementation of the architecture further implements a recommendation engine for suggesting intelligent actions following a session of input queries and query results. The recommendation engine provides the further benefit of encouraging additional interactive sessions via suggestions, questions, and data stories that follow any given query and response.

The closed-loop nature of the architecture captures and applies feedback from a specific requesting entity and community of requesting entities. The feedback adapts the architecture to handle future input queries, e.g., as a form of continuous optimization. The feedback causes the architecture, as examples, to generate different query response styles or package structures, apply different tone-of-voice, and execute different query result creation approaches. In one implementation, the architecture captures engagement levels at a large scale, identifying statistically significant differences, and improves the query result, e.g., the story-creation strategy. The query result may take the form of a data story that combines internal enterprise data with external content, social signals, competition, market intelligence, and other data. The architecture delivers the query result through, e.g., a natural language or interactive experience, to the query source and requesting entity.

Figure 2:
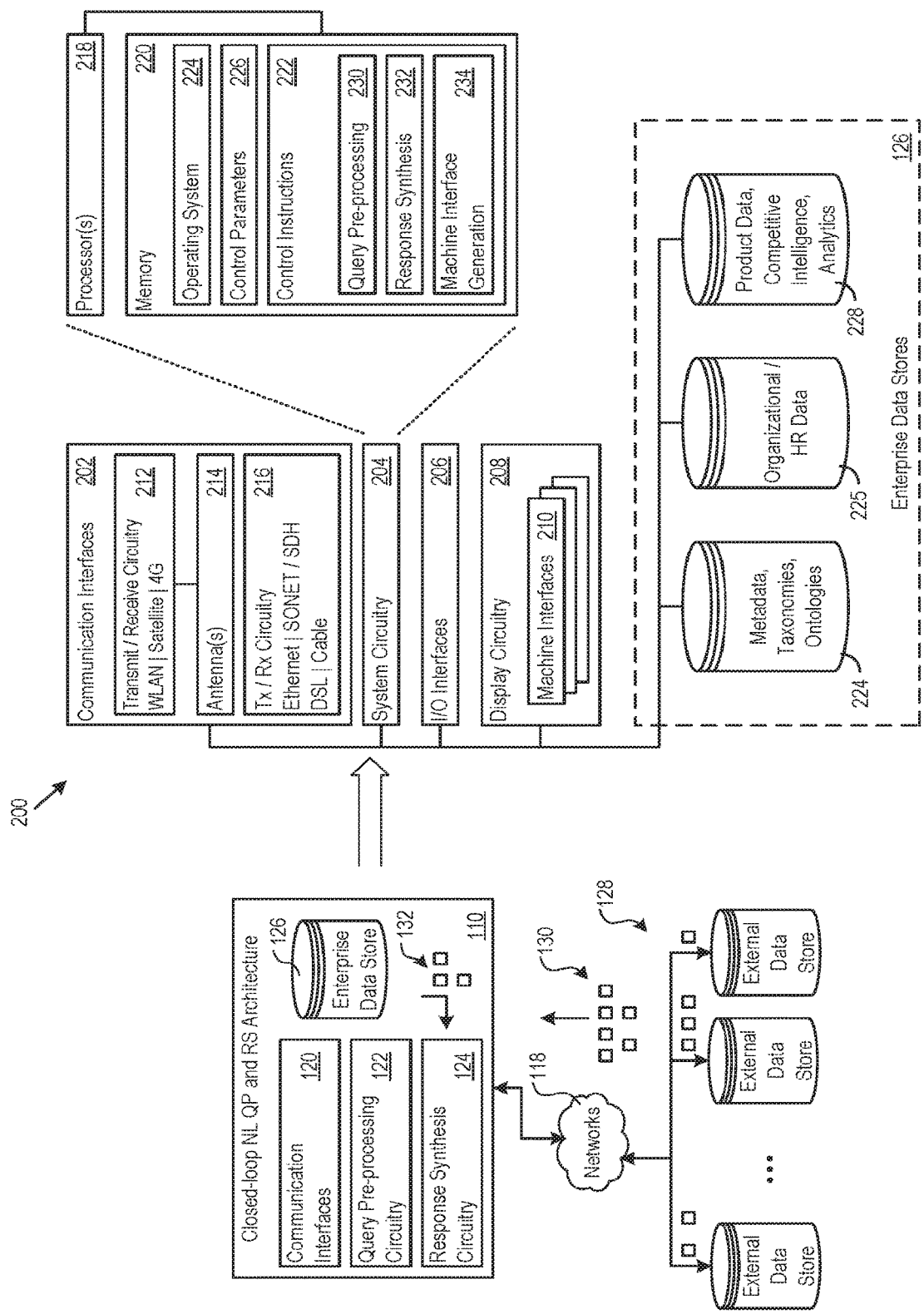
FIG. 2 shows an example implementation of a closed-loop natural language query pre-processor and response synthesizer architecture.

FIGS. 1 and 2 provide an example context for the discussion below of the technical solutions in the architecture, including the QPA and RSA. The examples in FIGS. 1 and 2 show possible implementations. In that respect, the technical solutions in the architecture are not limited in their application or implementation to the systems shown in FIGS. 1 and 2, or any of the other Figures. Instead, the technical solutions may be implemented via many other system implementations, architectures, and connectivities.

FIG. 1 shows network connected entities 100. The entities 100 include query sources 102, e.g., the smartphone 104 and the office computer system 106. Requesting entities 150 generate and submit natural language input queries 108 to a natural language query processing architecture 110. Examples of requesting entities 150 include human individuals and software programs, e.g., artificial intelligence applications, as well as scheduler programs that read input files with pre-generated questions. For instance, a smartphone application 112 or desktop PC application may accept microphone voice input from a requesting entity, connect to the architecture 110, transmit the natural language input query 108 to the architecture 110, and receive the query response 114. Communication between the entities and systems shown in FIG. 1 occurs over any number and type of public or private networks, e.g., the networks 116 and 118.

As described in detail below, the architecture 110 receives the natural language input query 108, analyzes and processes the natural language input query 108, and generates the query response 114. To that end, the architecture 110 includes communication interfaces 120 that connect to the networks 116 and 118, as well as query pre-processing circuitry 122 and response synthesis circuitry 124. The architecture 110 performs a directed search of multiple data stores, e.g., the on-premises enterprise data stores 126 and external data stores 128, to identify candidate response elements ("CREs"), e.g., the CREs 130, 132, for consideration in synthesizing the query response 114.

FIG. 2 shows another example implementation 200 of the architecture 110. The example implementation 200 includes communication interfaces 202, system circuitry 204, input/output (I/O) interfaces 206, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11b, g, n, or ac. The communication interfaces 202 may also include physical transceivers 216. The physical transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the architecture 110. As just one example, the system circuitry 204 may include one or more instruction processors 218 and memories 220. The memory 220 stores, for example, control instructions 222 and an operating system 224. In one implementation, the processor 218 executes the control instructions 222 and the operating system 224 to carry out any desired functionality for the architecture 110. The control parameters 226 provide and specify configuration and operating options for the control instructions 222, operating system 224, and other functionality of the architecture.

The architecture 110 includes the enterprise data stores 126. The enterprise data stores 126 may be hosted on volume storage devices, e.g., hard disk drives (HDDs) and solid state disk drives (SDDs). The enterprise data stores 126 may adhere to a very wide range of data structures and data types. As examples, the data structures may include: SQL, no-SQL, object-oriented, and relational databases; unordered and ordered storage mechanisms; structured files; hash buckets; trees; and other structures. The data types may include, as examples, database tables, columns, and fields; documents; graphs; metrics; files, such as Word, Excel, PowerPoint, PDF, Visio, CAD, Prezi, and database files; application data objects, e.g., calendar entries, task lists, and email file folders; and other data types. That is, the storage devices define, implement, and store data structures and data types that the control instructions 222 access, e.g., through a database control system, to perform the functionality implemented in the control instructions 222, including the identification of candidate response elements. In the example shown in FIG. 2, the enterprise data stores 126 include metadata, taxonomies, and ontology databases 224 used to help parse and contextualize the input query, organizational and human resources (HR) databases 225, and product data, competitive intelligence, and analytics databases 228. These example databases provide data relevant to the ongoing enterprise operations, and other enterprise databases may be present.

The control instructions 222 include query pre-processing logic 230. The query pre-processing logic 230, as described in more detail below, parses received natural language queries and executes directed searches for candidate response elements. The control instructions 222 also include response synthesis logic 232. As described in more detail below, the response synthesis logic 232 determines which candidate resource elements to include in a query response and the query response package structure. The response synthesis logic 232 then assembles the query response and transmits the query response to the query source and requesting entity. The machine interface generation logic 234 creates and delivers a linked interactive set of GUIs that facilitate interaction with the architecture 110, e.g., to accept submissions of natural language queries from query sources, to allow operators and query sources to set configuration and preference parameters, and to delivery query responses to the query sources.

The enterprise data stores 126, query pre-processing logic 230, response synthesis logic 236, and machine interface generation instructions 240 improve the functioning of the underlying computer hardware itself. That is, these features (among others described below) are specific improvements in the way that the underlying computer system operates. The improvements facilitate the generation of far more useful, accurate, and meaningful responses to complex natural language queries. The improved functioning of the underlying computer hardware itself achieves further technical benefits. For example, the architecture automatically performs the complex processing needed to generate meaningful query results, and thereby reduces manual intervention and reduces the possibility for human error. Still further, the architecture 110 facilitates a reduction in resource expenditure, including reduced storage volume accesses and processor-driven analytics, because the querying entities will perform less searching, browsing, and ad-hoc data analysis, in favor of submitting their query to the architecture 110 for targeted analysis and response.

Figure 3:
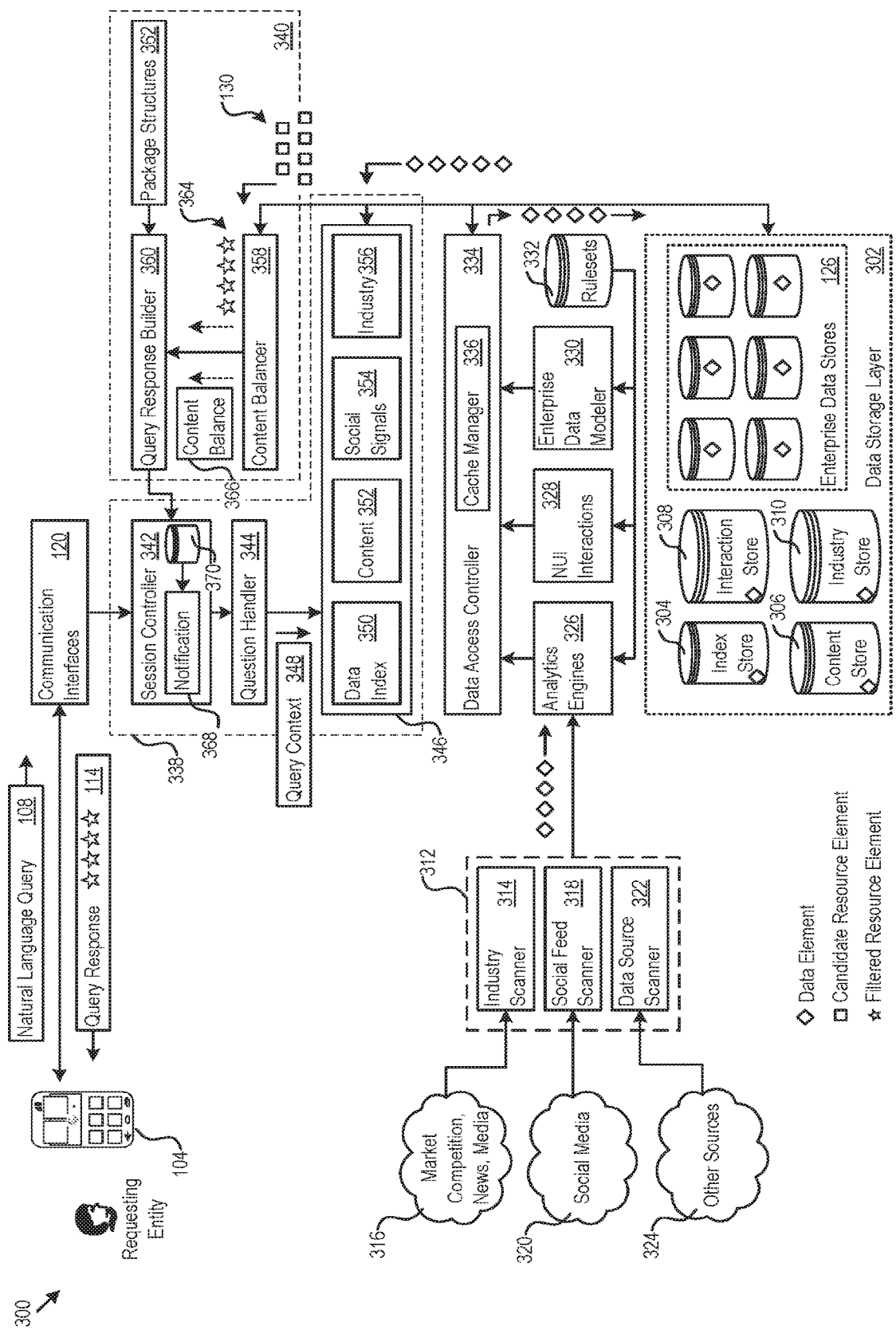
FIG. 3 shows another example implementation of a closed-loop natural language query pre-processor and response synthesizer architecture.

FIG. 3 shows another example implementation 300 of the architecture 110. As an initial matter, note that the implementation 300 includes a data storage layer 302. The data storage layer 302 refers to any number of local or remote data stores of any pre-defined type of data, and may be hosted and controlled by a given enterprise (e.g., associated with the requesting entity) or privately controlled (e.g., a newspaper or social media database). As a few examples, the data storage layer 302 includes a data index store 304, which stores quantitative data information such as key performance indicators (KPIs), metrics, time series data and other quantitative statistics, optionally mapped to specific entities, processes and products; and data dictionaries, business questions and roles. A content store 306 is also present, and stores external content metadata, social media, social signals, feed content, tags, product references, competitor websites, news sources, reputation data, trends, analytics, dynamics, content links, data links, online resource links and other data. The links may be in the form of URIs or URLs, for instance.

As additional examples, the data storage layer 302 includes an interaction store 308, which stores records capturing history of interaction with query sources and query entities, the natural language queries, the query responses, assessments, and other engagement level data. An industry store 310 is also present, and stores product performance, metrics, usage, corporate data, targets, budgets, competition watch data (e.g., on competitor products), customer data, satisfaction data, customer interaction data, and other enterprise relevant data. The data stores 304, 306, 308, 310 hold data generated or obtained from entities external to the enterprise that hosts the architecture 110, and they may be maintained by the enterprise locally or may be maintained by external third parties.

Data Storage Layer

The data storage layer 302 may also include enterprise-specific data stores 126. The enterprise data stores 126 may hold data obtained from enterprise data sources, e.g., data that originated from within the enterprise as opposed to from an external system or entity. Examples of such data include enterprise metadata, ontologies, taxonomies, data marts, analytics data, business intelligence data, organizational data, product catalogs, and the like. Additional examples of enterprise data include human resources (HR) data concerning requesting entity roles, job positions, and other aspects relevant to the enterprise, including years of experience, project history, position, division, geographical location and responsibilities, position within the enterprise, budgets, targets and goals, team structure, and the like. As one specific example, the HR data may indicate that a particular requesting entity is an electrical engineer with 8 years of experience in satellite transceiver design, working in a group of 10 engineers currently on the next-gen space telescope project within the enterprise, with prior experience on satellite designs X, Y, and Z, who reports to a designated manager M, and who has used specified transceiver components A, B, and C from suppliers R, S, and T in the last five years in specified designs.

In FIG. 3, the architecture 110 includes intelligent data scanners 312. The industry scanner 314 monitors and retrieves data elements from any pre-configured set of market, news, and media sources 316 relevant to the industries associated with the enterprise. Examples of such sources include newspapers, financial websites, and competitor websites. The social feed scanner 318 monitors and retrieves data elements from any pre-configured or discovered (e.g., via ongoing probing, tracking, and identification of new sources) set of social media sources 320. Examples of such sources include RSS feeds, social network feeds and websites, messaging services, image sharing services, and the like. Any number of other data source scanners 322 may be present as well, e.g., an Internet retail scanner, to obtain data elements from any number of other pre-configured data sources 324, e.g., to gather sales data from Internet retail websites.

The data elements may vary widely in form and content. As just a few examples, the data elements may include Uniform Resource Locators (URLs), website HTML, text, audio, quantitative data, feed components, video data, or descriptive metadata for such data elements. As additional examples, the data elements may include files of any particular type or organization, e.g., Word, Visio, PowerPoint, movie, sound, text, or PDF files. Further examples of data elements include data structures and data types that applications operate upon, including email messages, electronic contact cards, calendar entries, and task lists.

The analytics engines 326 process the data elements that the scanners have retrieved, may decide which to retain and in what format, and request storage of the data elements in the data storage layer 302. The analytics engines 326 also identify and extract implicit and explicit entities from the input queries, generate summary entries describing valid input queries, generate metadata tags for the input queries, and store and index this data in the data storage layer 302. The analytics engines 326 may also identify and store pointers (e.g., URIs and URLs) to the content in the original data source. In one aspect, the analytics engines 326 ensure that the structured, semi-structured, and unstructured content captured by the data scanners 312 is summarized, characterized, index, stored, and associated with existing data and ontologies, and therefore becomes readily searchable and available to the architecture 110. That is, the processing performed by the analytics engines 326 facilitates rapid search, discovery, and retrieval responsive to similarity-based matching.

Additional data elements may arrive from other sources. For instance, the natural user interface (NUI) interaction manager 328 may receive voice, gestural, video, touch and other system input from the requesting entity. The NUI interaction manager 328 may consider these inputs, e.g., a voice command, as data elements of potential interest for answering natural language queries. As another example, the enterprise data modeler 330 may monitor, retrieve, and process enterprise structure, teams, organizational charts, internal communications, databases, document storage, email, calendars, websites and other enterprise data sources to identify and retrieve data elements of potential interest as well.

The analytics engines 326, NUI Interaction engine 328, and enterprise data modeler 330 process the data elements according to and/or against any rulesets 332. The rulesets 332 may be static or dynamic, e.g., rules that are pre-defined or dynamically created or modified by, for instance, ongoing machine-learning algorithms, data mining algorithms, or explicit operator updates. The rulesets 332 may cause the analytics engines 326, NUI Interaction engine 328, and enterprise data modeler 330 to carry out specified operations when pre-established conditions are met. As just a few examples, the operations may include deleting, dropping, or ignoring the data element, storing the data element in the data storage layer 302, updating previously stored data elements in the data storage layer 302 with the newly received data element, tagging the data element with descriptive metadata, editing the data element to retain, delete, or modify specific portions of the data element, converting the data element to a different file format, structure format, or content type, merging, enriching, summarizing the data element, and other operations. Note that the rulesets 332 do not necessarily cause immediate processing of the data elements. In other implementations, some or all of the rules in the ruleset 332 may be executed when specified by other components in the architecture 110. That is, other components (e.g., any part of the RSA) may determine when the rules fire to obtain the results defined by the rules.

The data scanners 312 may take a wide range of forms. As one example, a particular data scanner may be a web-crawler implemented as a bot process that runs regularly and autonomously to scan a set of data sources, extract data elements, execute the processing noted above, and store the data elements, metadata, and other derived data in the data storage layer 302.

In one implementation, a configuration layer accepts operator input that defines a set of target data sources (e.g., news sites and other online locations) to include in the web-crawling process. In other implementations, the architecture 110 may autonomously build, maintain and extend the set of data sources included in the scanning process. This extension may be supported by extracting the context of the particular business/enterprise, performing online searches for relevant content, determining popularity of these resources (via the Alexa™ analytics service for instance), selecting the most relevant (to the enterprise) and most popular (by category) to include. Other implementations may provide hybrid solutions, e.g., configuration via operator input and auto-discovery of potentially valuable online resources which are relevant to the business.

A data access controller 334 executes data read/write/modify operations on the data storage layer 302. The data access controller 334 may be implemented as a set of software components that manage data stored in one or more data management systems. The data management systems may be any type of file system or database management system that carries out the read/write/modify operations on the records stored in the data storage layer.

A cache manager 336 provides a high speed local data store that accelerates responding to future requests for data elements recently accessed in the data storage layer 302. The cache manager 336 takes advantage of the knowledge and predictive capability of the architecture 110 in order to optimize its state and readiness. For instance, the architecture 110 may predict certain types of questions to be asked within a given time frame based on, e.g., seasonality patters, and signal the questions and relevant data elements to the cache manager 336. The cache manager 336 may pre-load the data elements and metadata regarding the types of questions into the cache, and remove data elements less likely to be needed. In this manner, the architecture 110 implements a predictive, contextualized caching strategy with continuous optimization.

Query Pre-Processing Circuitry

FIG. 3 also illustrates an example implementation of the query pre-processing circuitry 122 to realize a QPA 338. In this example, the QPA 338 includes a session controller 342, a question handler 344, and a content synthesizer 346.

The session controller 342 accepts, maintains, and closes session connections with the query source and requesting entity. The session controller 342 handles session interaction and flow with the query source and requesting entity. For instance, the session controller 342 may present any pre-defined set or sequence of GUIs to the query source and requesting entity and respond to inputs from the query source and requesting entity. In that regard, the session controller 342 may accept login information, identify session history (e.g., as captured in the interaction database 308) and provide the history to other processing stages for consideration in creating query responses, accept new natural language queries, initial query processing on a natural language query, deliver query responses to the query source, and maintain session history data for the query source and requesting entity. In one implementation, the session controller 342 exchanges data, e.g., the natural language query, session history, and query responses, with other system components via application programming interfaces (APIs) that provide pre-defined data exchange interfaces between the components.

The question handler 344 receives the natural language query from the session controller 342 and performs initial query processing. As examples, the question handler 344 may tokenize and validate the question, e.g., by checking whether the question parses without errors through a natural language parser; remove noise in the question, e.g., by removing pauses, background signal noise, and words or phrases with little or no information content; identify entities named or inferred in the natural language query; to tokenize words and phrases in the natural language query; to create and attach metadata, e.g., to capture the named or inferred entities, to characterize the query source or requesting entity, and to characterize the enterprise associated with the requesting entity. These structural aspects of the input query form part of the query context 348, and the question handler 344 creates and attaches the query context 348 to the natural language query for use by the other system components.

In some implementations, the question handler 344 predicts potential forthcoming questions from the requesting entity within the active session maintained by the session controller 342. Expressed another way, given one or more questions in the overall session, and taking into consideration the history of the querying entity, the architecture 110 can predict with confidence specific questions to follow. In that regard, the question handler 344 receives the current natural language input query 108, and with the query context 348, and session history data, determines one or more queries that are likely to follow. Having the set of predicted queries, the architecture 110 may then attempt to generate responses to any or all of them. The responses generated to predicted queries may be added to the set of candidate response elements (CREs) for answering the current query. The proactively generated responses may then form part of the response to the current query, thereby proactively delivering additional useful information to the querying entity.

With regard to prediction, the question handler 344 may analyze queries received, e.g., from similar requesting entities by profile, role, position, seniority, or other characteristics and in similar organizations by size, industry, market, or products, given the current natural language query. The question handler 344 uses the accumulated session history both within a corporation and obtained from public domain metadata and patterns if available, to predict the correlated questions which are expected to follow given a particular current natural language query or sequence of queries. In that regard, the query context 348 may further include the correlated questions. In this way, the question handler 344 helps the architecture determine and set query context, generate responses for the correlated questions, and proactively uses the generated responses, e.g., as CREs, during response synthesis. The resulting query response may thereby take the form of a data story that follows an expected or predicted, pattern based, sequence of correlated questions and their responses.

The content synthesizer 346 determines which data elements in the data storage layer 302 are relevant enough to qualify as CREs for further consideration and analysis by the system, given the natural language query and the query context 348. In that regard, the natural language query and the elements in the query context 348 are query components that the content synthesizer 346 may use to search the data stores in the data storage layer 302. The content synthesizer 346 may be implemented in many ways. In the example shown in FIG. 3, the content synthesizer 346 implements search engines tailored to the specific types of data elements in the data storage layer 302. More particularly, the content synthesizer 346 implements a data index search engine 350, a content search engine 352, a social signals search engine 354, and a product search engine 356.

The data index search engine 350 searches the data elements in the index store 304 in the data storage layer 302. In other words, the data index search engine 350 locates, e.g., KPIs and other metrics that are relevant to the natural language query received at the session controller 342, given the query context 348. The data index search engine 350 also ascertains applicable dimensions for those data elements. As some examples, the applicable dimensions may characterize the data element by time frame, product, team, territory, or other dimension. The search engines 352, 354, and 356 discussed below may also apply dimensional filters to their search results to filter data elements and determine CREs.

Note that the query context includes several aspects describing the initial query, the person posing the query, the correlated questions, and other context. The context also includes explicit and implicit entities. Take for instance the query "How well is laptop series X doing?" The architecture 110, by understanding the query, e.g., by interpreting 'doing' into a series of correlated business activities such as sales, and production levels, knows it needs to process time-series data and/or related KPIs (e.g., KPIs for sales of series X and the related enterprise in general). The data index store 304 has information about the dimensions and hierarchies corresponding to the KPIs associated with the business activities for the particular corporation, environment, or enterprise. The architecture 110 next determines the applicable dimensions, e.g., product, territory, technology platform, OS & version, particular components/processor type, manufacturing plant, time frame, and the like, and also the right focus, e.g., the filtering to be applied, including time frames. Assume for instance that the architecture 110 identifies that the person posing the query is the Sales Director for Hi-Tech Devices in the Europe region. In response, the architecture 110 may then decide to retrieve, aggregate and present sales data and/or insights, KPIs and other metrics by territory, and by product category comparing aggregated sales data for laptop series X versus all other product categories within the Hi-Tech Devices segment. Also, since the architecture 110 knows the territory of responsibility of the enterprise user posing the question, namely Europe, the RSA may create a data story including a presentation of a break-down by territories within Europe vs aggregated figures for markets across the world. In this example the architecture 110 uses context to focus on two particular dimensions (geography and product category). The architecture 110 also focuses on the appropriate entry point and data, by ignoring other dimensions which are more technical, like the OS and HDD size, and also focused on territory and the right level within the product hierarchy.

Suppose instead that the architecture 110 identifies that the person posing the query is the Product Director for OS W Laptops, Globally. The architecture 110 will filter on the product hierarchy to select the particular set of products and other relevant dimensions such as product Type or product Class. For instance, the architecture 110 may present the sales figures for OS W devices broken down by type of device (laptop, desktop, mobile) or version of the operating system (dimension: OS version). In the same example, since the enterprise entity posing the query is responsible for the global market, the system may respond with a sales break down by market.

In both cases the sales break down by one or more dimensions can be visualized by summarized figures, tabular forms, multi-way table formats, related charts, or any combination of these. Further, in both cases the system may focus on particular time frames based on the current state of the fiscal year of the corporation, relevant seasonal patterns, and critical dates associated with the querying entity. For example, if the product series of the input query is new (e.g., less than a threshold number of months) the architecture 110 may present daily growth statistics versus quarterly results. Also, given that the product is new, the architecture 110 may automatically retrieve and incorporate in the query response the aggregated user reviews from the public domain.

The data index search engine 350 may then filter the data elements through dimensional filters. The dimensional filters reduce the set of located data elements to those which best fit the dimensional context of the natural language query, e.g., those data elements in the index store 304 that match most closely in time, by product, geography, or other dimension. The data index search engine 350 outputs the data index CREs originating from the index store 304 that have relevant dimensions (e.g., time, product, location) to subsequent processing stages, including the RSA 340. In addition, the data index search engine 350 may output to subsequent processing stages any relevance scores it determined against the pre-determined dimensions for each data index CRE.

The content search engine 352 identifies relevant content from articles, marketing materials, web sites, video, news feeds present or referenced in the content store 306. This type of content often takes the form of written description materials, as opposed to the quantitative data index information stored in the index store 304. The content search engine 352 identifies directly and indirectly related public or enterprise internal materials relevant to the natural language query and the query context 348 (including the correlated questions). In that regard, the content search engine 352 may search for data elements in the content store 306 that identify as CREs those data elements that match product references, competitors, market characteristics, industry, seasonality characteristics, related business activities, and the like. The content search engine 352 outputs the content CREs and any relevance scores to subsequent processing stages, including the RSA 340.

The social signals search engine 354 identifies, as social CREs, relevant social content data elements. As noted above, the social feed scanner 318 and analytics engines 326 monitored, retrieved, and stored these data elements in the content store 306. The social content data elements may vary widely in form. Examples include trends, stories, message threads, blog posts, metadata (e.g., concerning popularity and trends) and other types of social media. The social signals search engine 354 outputs the social CREs and any relevance scores to subsequent processing stages, including the RSA 340.

The industry search engine 356 identifies industry CREs. The industry CREs may be selected from the data elements in the industry store 310. As noted above, the industry scanner 314 and analytics engines 326 monitor and retrieve data elements from any pre-configured set of market, news, and media sources 316 relevant to the industries associated with the enterprise and its competitors. Accordingly, the industry search engine 356 may search for relevant data elements from web resources including news and media websites, as well as specialized business and industry data sources, and academic papers, technology reviews, published patent repositories, specialized media and press, online books, industry research, and the like. The industry search engine 356 outputs the industry CREs and any relevance scores to subsequent processing stages, including the RSA 340.

Response Synthesis Circuitry

FIG. 3 also illustrates an example implementation of the response synthesis circuitry 124 to realize a RSA 340. The RSA 340 makes final decisions concerning which CREs to retain, and builds the actual query response. In the example implementation shown in FIG. 3, the RSA 340 includes a content balancer 358 and a query response builder 360. A query response may adhere to any particular structure, e.g., as specified in any set of pre-defined package structures 362, or according to dynamically determined package structures decided by the query response builder 360. The content balancer 358 receives CREs from the content synthesizer 346 and applies filters, e.g., a ranking filter with configurable relevance cutoff or threshold, to obtain filtered resource elements (FREs) 364.

The query response builder 360 constructs the query response 114 by adding the FREs 364 in sequence and form according to the selected package structure for the query response. The query response builder 360 sends the query response 114 to the session controller 342. The session controller 342 returns the query response 114 to the query source, while creating and storing session history information characterizing, e.g., the query source, requesting entity, query response, query context, and the query itself. The session history may further include the response times for each of the components in the architecture 110, processing checkpoints, processing status (e.g., error codes and descriptions), and other architecture specific performance data. The performance data may drive self-optimization of the architecture 110 and changes to the end-user experience in closed-loop fashion.

The content balancer 358 customizes the query response for the particular requesting entity and query source. The customization may take the form of allocating the amount of different types of content in the query response. That is, the content balancer 358 may determine a content balance 366 between types of FREs. In the example of FIG. 3, the content types include numerically descriptive data CREs, e.g. data index CREs from the index store 304; content CREs from the content store 306, e.g., audio, visual, and textually descriptive CREs; and industry CREs from the industry store 310, e.g., enterprise and competitor specific industry reports and news. The content balance 366 may extend to other types of CREs and provide additional granularity. For instance, the content balance 366 may specify a percentage or percentage range of content in the query response for different individual data types, e.g., audio, video, text, and quantitative metrics, over all CREs or over specific types of CREs.

The content balance 366 may be responsive to the query source and requesting entity metadata, including role, enterprise type, industry, markets, class of query, season pattern, product or project, and geographical data. For instance, an executive role may cause a content balance with a larger percentage of index CREs, e.g., to quickly convey performance metrics, and a smaller percentage of lengthy descriptive CREs, e.g., that would convey lengthy product reviews. On the other hand, an engineer role may cause a content balance with approximately equal percentage of numerically descriptive CREs, e.g., concerning component performance, as well as content CREs, e.g., that include data sheets, design notes, and design examples.

In determining the content balance 366, the content balancer 358 filtering may also be responsive to implicit and explicit preferences of the query source and requesting entity. The preferences may be captured in the enterprise data stores 126 or by the session controller 342, as examples.

The content balancer 358 filtering may be further responsive to the history of content consumed, the preferred types of media consumed, seasonality patterns, and other factors. To that end, the content balancer 358 may determine, for each CRE, a customization relevance score. The content balancer 358 may update the customization relevance score according to any pre-defined schedule, and the customization relevance score may therefore be applicable for any given point in time or window of time.

The content balancer 358 may also be responsive to metadata that characterizes the query source and requesting entity, content consumption patterns, and system interaction patterns to identify CREs. The content balancer 358 ranks CREs in terms of relevance and probability to be of interest to the requesting entity, often referred to as 'personalization'. The rankings may be responsive to social performance metrics (e.g., click through rate (CTR) and other engagement levels), viral indicators, and other metrics, whether external and public or internal and private within the enterprise. Expressed another way, the content balancer 358 determines, for each CRE, the relevance to the natural language query, relevance to the requesting entity, relevance in time, market, role, enterprise type, and other pre-determined dimensions. The content balancer 358 may then apply weighting factors to define overall relevance and apply a filter (e.g., a configurable relevance cutoff) to determine the FREs 364.

The query response builder 360 constructs the query response. In that regard, the query response builder 360 packages the FREs according to a particular package structure. The package structure may adapt to or be chosen responsive to the query source, requesting entity, query context, and other factors. The package structure may also specify an element sequence, and the element sequence may also depend on the query source, requesting entity, query context, and other factors. As such, the query response adapts in presentation, content, pattern, interactive nature, and visualization for each natural language query, querying entity, and query source. The query response builder 360 may also determine the duration of the query response, and response length may be additionally or alternatively specified in the package structure.

A package structure may specify data element type, sequence, position, length (e.g., number of words of text or minutes of video), format, and other characteristics. Specific examples of data element types include: plain or ASCII text; rich text or HTML, including hyperlinks; audio, e.g., voice (including text, HTML, or other written document FREs converted to speech by the architecture 110) or music; interactive visualizations, e.g., a sequence of images, graphs, charts, content previews with links, facts, and statistics; video; virtual reality or holographic data streams; or any combination of such data elements.

As a further example, the RSA 340 may adjust the content balance 366 and package structure according to query source characteristics and communication channel characteristics. These characteristics may be obtained, e.g., by querying the communication interfaces 120 for connection details. For instance, when the connection details indicated that the query source is a powerful computer communicating over a high bandwidth Ethernet connection, the content balance 366 and package structure may favor high bit rate CREs (e.g., high bit rate video or lossless audio), and allocate a relatively greater percentage of high bit rate content to the package structure. On the other hand, when the query source is a low power cell phone, communicating on a relatively slow or expensive cellular data connection, the RSA 340 may favor lower bit rate CREs and allocate a greater percentage of the package structure to lower bit rate data elements. Further, the overall length of the query response may change based on the query source and communication channel characteristics, e.g., with high speed networked devices receiving longer, more data intensive, query responses that may include additional FREs and higher bit rate FREs. Additional examples of connection details include a wide range of state information characterizing the requesting entity or requesting device. State information may include, as just a few examples, details on whether the requesting entity or requesting device is in-motion, and how fast; location, e.g., in a car or in a building; about of energy remaining, e.g., remaining battery power in a smartphone.

The query response builder 360 is not limited to packaging FREs. Instead, the query response builder 360 may generate and return additional content to the requesting entity. Examples of additional content include prompts for further input from the requesting entity, as well as recommendations for the requesting entity. That is, the architecture 110 communicates the additional content to the requesting entity along with the query response.

With respect to the additional content, the query response builder 360 may propose contextually appropriate actions in view of the natural language query and query response. One example of a recommendation is to setup a meeting with specified engineering employees, responsive to a natural language query asking for data on product failures. An example prompt is to request whether the querying entity wants the architecture 110 to execute a targeted search for competitor product failures reported in the industry literature in the past five years.

The architecture 110 may implement, e.g., as part of the session controller 342, an intelligent notification layer 368. The intelligent notification layer 368 may automatically send query response updates triggered by any pre-determined follow-up notification rules 370, e.g., triggered by updated data elements received by the scanners 312 that are relevant to any prior query response. That is, the intelligent notification layer 368 determines when to send an update, and given the session history, which requesting entity should receive the update, and the channel over which to send the update.

In some implementations, the intelligent notification layer 368 responds to calendar events, meeting schedules, financial result reporting schedules, and the like. In this respect, the intelligent notification layer 368 proactively causes the architecture 110 to synthesize and distribute data stories relevant to any selected or pre-specified set of entities, adapted to the preferences and characteristics of those entities, and in response to any prior input queries captures in the session history.

Figure 4:
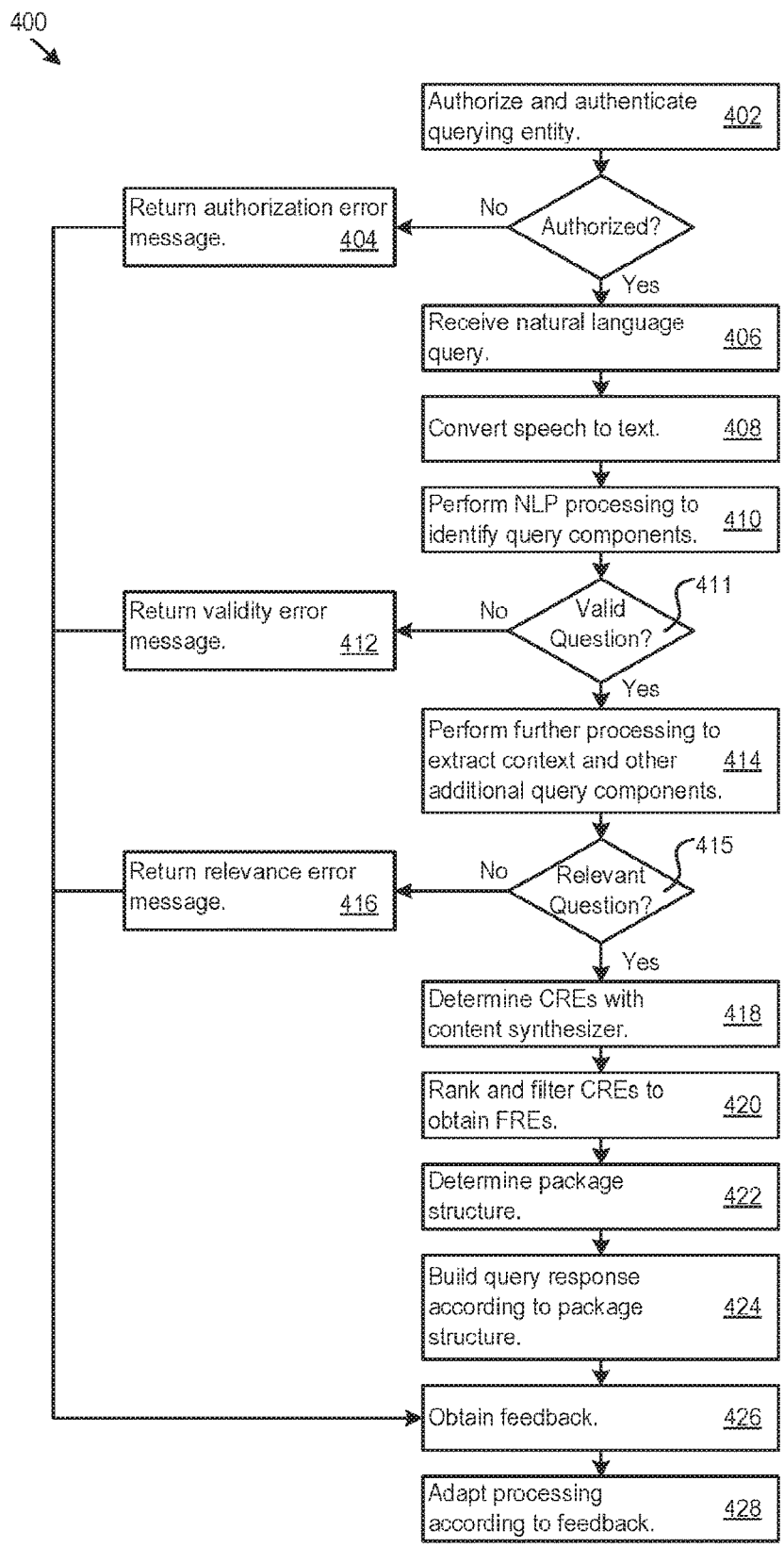
FIG. 4 shows a flow diagram of logic that a closed-loop natural language query pre-processor and response synthesizer architecture may implement.

FIG. 4 shows a flow diagram of end-to-end logic 400 that the architecture 110 may implement. The architecture 110 authorizes and/or authenticates a requesting entity who is connecting to the system (402). If the system cannot authorize the requesting entity the architecture 110 returns an authorization error message (404). Otherwise, the architecture 110 receives a natural language query (406) from the requesting entity. The natural language query is converted to text (408), and the QPA 338 executes natural language processing (NLP) tools and performs other analyses on the converted query to identify query components.

In some implementations, the QPA 338 may determine, responsive to an output of the NLP tools, whether the question is valid (411). For instance, the question may be valid if it forms a complete, grammatically correct question. If the question is not valid, the QPA 338 returns a validity error message (412).

The QPA 338 may perform additional pre-configured processing to determine further query components for the query (414). As examples, the QPA 338 may determine contextual details, or an entity name that is explicitly included in the natural language input query, e.g., the explicit name of the enterprise or product. Similarly, the QPA 338 may determine an entity implied but not explicitly included in the natural language input query, e.g., by searching a data store of known competitors of the enterprise or competing products.

Given the query components and the query itself, the QPA 338 may determine whether the question meets any defined relevance criteria, e.g., whether the query is relevant to the enterprise, relevant to the business environment, or relevant to a work objective of the querying entity, or meets any other criteria (415). That is, the QPA 338 may screen out questions that have no meaningful connection to the operation of the enterprise, and for those questions return a relevance error message (416). Examples of such questions are those that have no query components matching products, services, personnel, geographies or other characteristics associated with the enterprise.

For relevant questions, the QPA 338 executes the content synthesizer 346 to determine initial CREs (418). The RSA 340 may then rank and filter the CREs to obtain FREs (420). As noted above, the RSA 340 determines a package structure for the query response (422), and builds the query response by sequencing the FREs in form and content according to the package structure (424).

Any interactions with the architecture 110 may give rise to feedback, e.g., from the querying entity (426). The architecture 110 then adapts its processing according to the feedback, providing closed-loop control over the architecture 110. Examples of feedback include: a notice from the querying entity that that query response contains too much or not enough historical information; that the query response contains too much or too little text, video, voice, statistics or other type of data; and that the query response covers too much or too little geography. Additional examples of feedback include: requests for clarification of query response; requests for a break-down of the query response into more granular elements; a request for additional details; follow-up questions that ask 'why', 'how', 'when', 'what', and the like. Yet another example of feedback is a request for a prediction, in response to which the architecture 110 may synthesize an answer that delivers the requested estimate (e.g., for a sales prediction). In any event, the architecture may adapt future query responses according to the feedback. The adaptation may be global, or may be applied or limited to future query responses for the querying entity or set of related entities (e.g., all managers or engineers at the same level as the querying entity).

Figure 5:
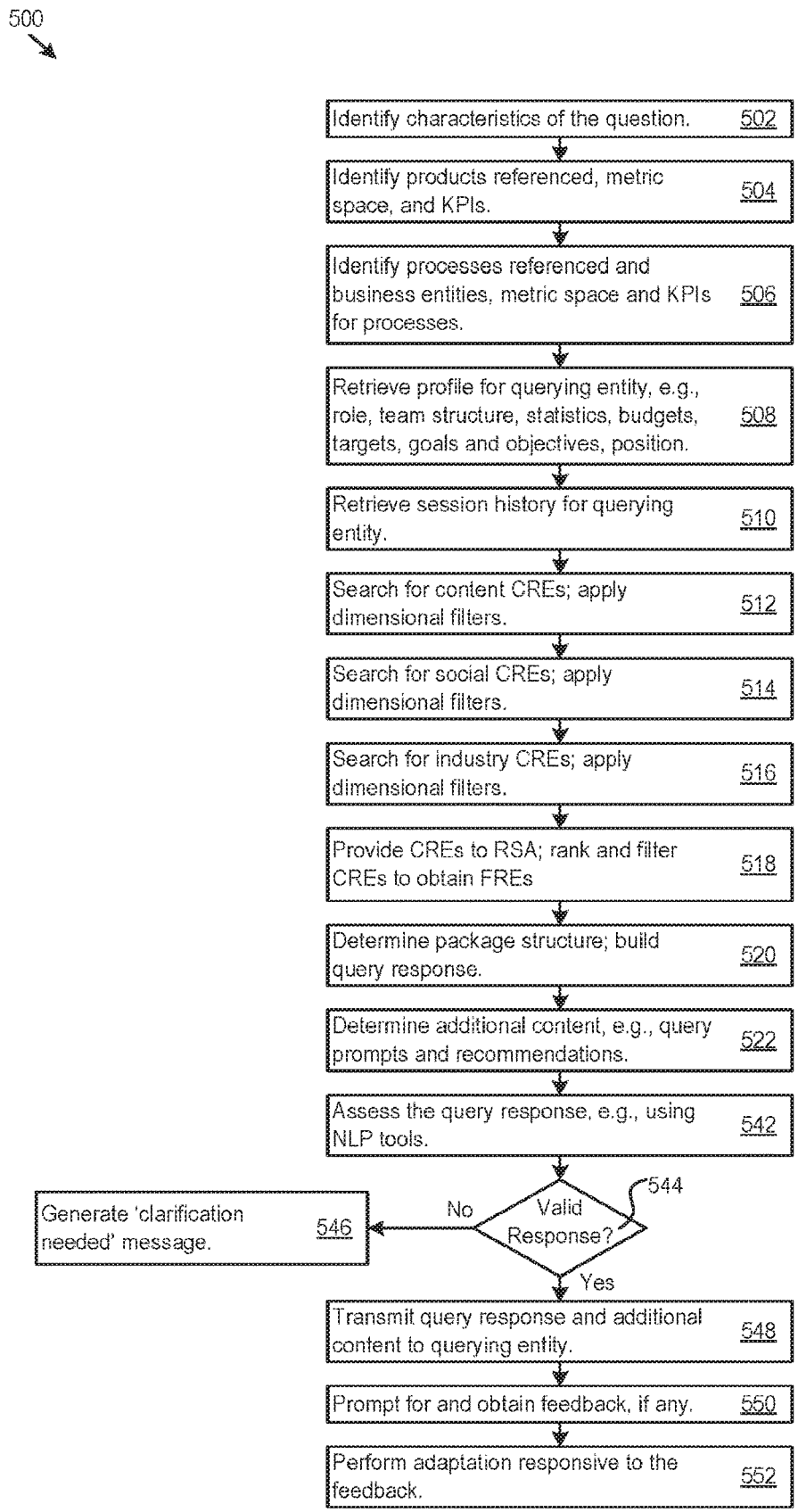
FIG. 5 shows a flow diagram of additional logic that a closed-loop natural language query pre-processor and response synthesizer architecture may implement.

FIG. 5 shows a flow diagram of logic 500 that the architecture 110 may implement in the QPA 338 and RSA 340 with regard to synthesizing the query response. The architecture determines characteristics of the question (502), captured, e.g., as query context 348. Such characteristics include explicitly and implicitly mentioned entities, time frame, geography, and the like. In that respect, the architecture 110 may also determine products referenced, and any applicable metrics or KPIs for the products (504). The architecture 110 similarly identifies processes and entities referenced and their applicable metrics and KPIs (506).

The architecture 110 also obtains profile details for the requesting entity, e.g., the entity role, team and enterprise structure (e.g., organizational charts showing employee and manager relationships, departmental charts showing relationships between enterprise divisions, chain of command charts, and other types of structure information), statistics, budgets, targets, goals, objective, and the like from the enterprise data stores 126 (506). As noted above, the architecture 110 also considers historical information in formulating query responses. For that reason, the architecture 110 may obtain session history, e.g., concerning the requesting entity, such as prior queries and responses (510).

The QPA 338 searches for CREs. For instance, the QPA 338 may search for and retrieve content CREs (512), social CREs (514) and industry CREs (516). The QPA 338 may apply dimensional filters as noted above in its selection of CREs to hand off to the RSA 340. The RSA 340 ranks and further filters CREs to obtain FREs (518). The RSA 340 determines a package structure and packages the FREs accordingly (520). As further noted above, the architecture 110 may also determine additional content, such as query prompts and recommendations which may accompany the query response.

In some implementations, the RSA 340 executes a validity check on the query response (544). For instance, the RSA 340 may execute NLP parsing tools on the query response to determine if the response meets any pre-defined validity criteria, e.g., that the query response takes the form of a complete, grammatically correct statement or series of statements. If not, the RSA 340 may generate and return a 'clarification needed' message to the requesting entity (546), without returning the query response or additional content. Otherwise, the RSA 340 transmits the query response and additional content to the querying entity (548).

In addition, the RSA 340 may perform an access-rights check that must be passed before returning the query response. In that respect the RSA 340 may ascertain whether any of the FREs in the query response are secret, classified, enterprise-confidential, or otherwise restricted. If the querying entity has authorization, then the RSA 340 may return the query response. In addition, the RSA 340 may determine whether the query source meets defined security requirements for receiving the query response. For instance, the RSA 340 may prevent a personal smartphone from receiving the query response, but permit a corporate PC in a particular office to receive the query response. In other implementations, the RSA 340 may instead remove the restricted FREs from the query response, may ask for authorization or authentication credentials before returning the query response, may issue an informational message about needing special permissions to receive the query response, or take other actions when restricted FREs are present.

As explained above, the architecture 110 is closed-loop. Accordingly, after delivery of the query response, the architecture 110 may prompt for and obtain feedback from the querying entity or other feedback source (550). The architecture 110 may then adapt responsive to the feedback (552).

Figure 6:
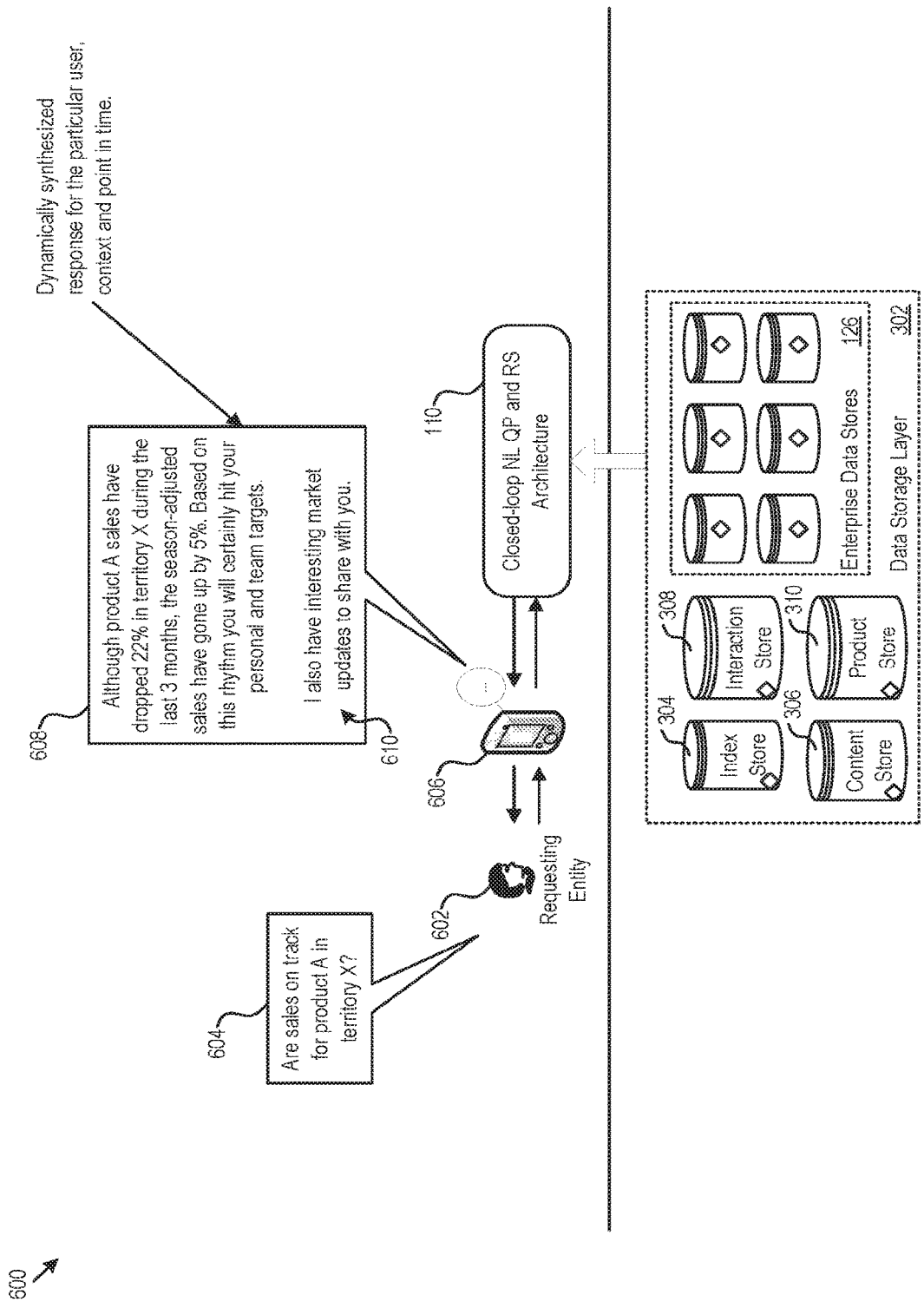
FIG. 6 shows an example system interaction.
Figure 7:
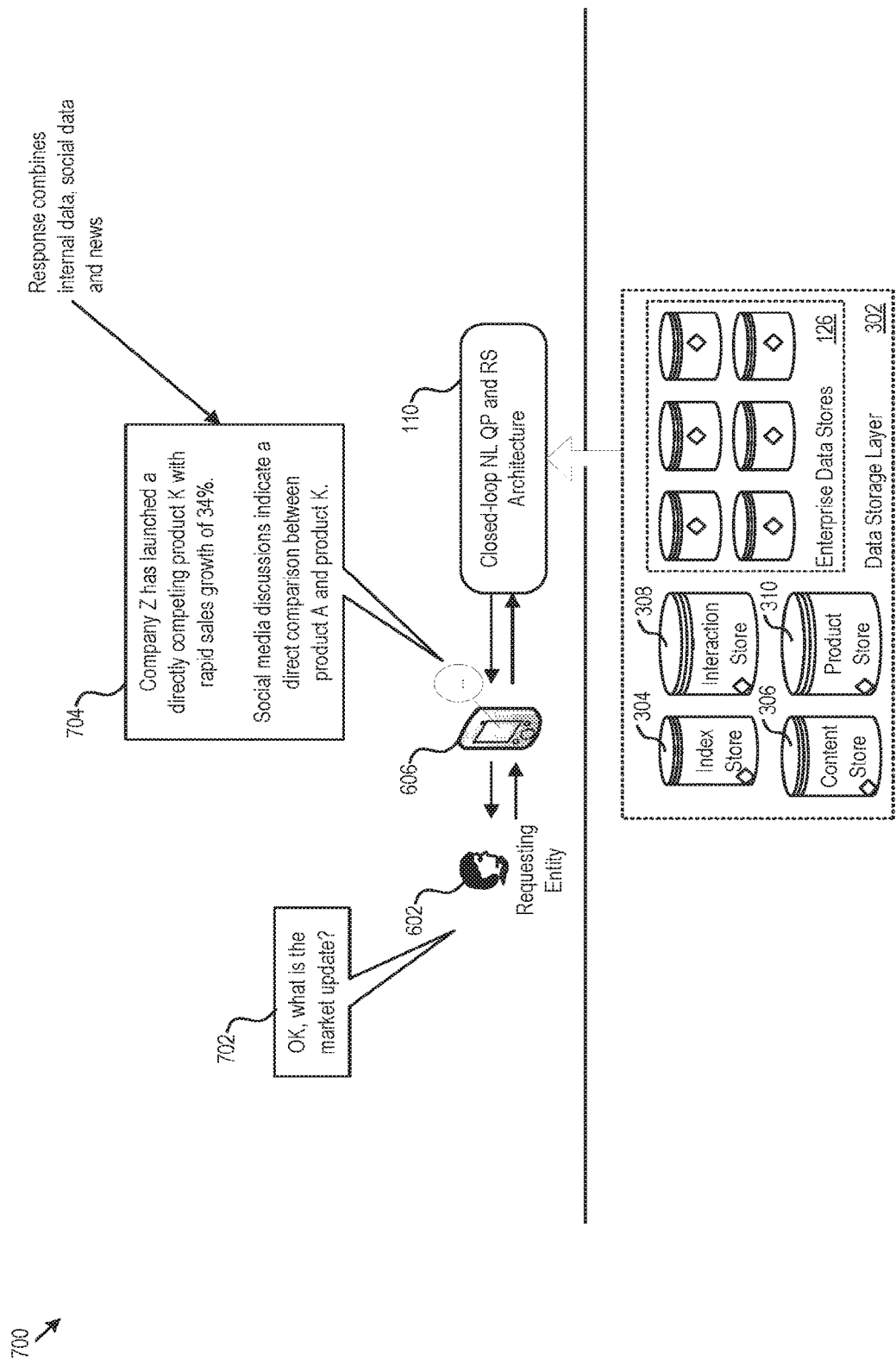
FIG. 7 continues the example of FIG. 6.

FIGS. 6 and 7 show example interactions with the architecture 110. In the example exchange 600 in FIG. 6, the requesting entity 602 submits a natural language query 604 in voice form to the architecture 110. FIG. 6 shows that the querying entity has received a query response 608 from the architecture 110. The query source is the smartphone 606, which has established a communication channel to the architecture 110. The smartphone 606 interacts with the session controller 342 to submit queries and receive query responses.

In the example of FIG. 6, the natural language query 604 is: "Are sales on track for product A in territory X?" The query response 608 is: "Although product A sales have dropped 22% in territory X during the last 3 months, the season-adjusted sales have gone up by 5%. Based on this rhythm you will certainly hit your personal and team targets." In this case, the package structure of the query response 608 defines, overall, a voice response. The voice content may result, e.g., from the RSA 340 applying a text-to-speech engine on the assembled sequence of FREs. In this instance, the FREs include the index data of "dropped 22%" and "up 5%", geographical specifier of "territory X", and time frame specifier of "last 3 months" and "season-adjusted". In other cases, the package structure may define, overall, a web-page response for viewing in a browser, PDF document response, PowerPoint presentation response, an animated or interactive experience that includes graphics, voice, sound, music, video, or other components, or any other response format.

The query response 608 includes an additional content indicator 610, namely the prompt: "I have interesting market updates to share with you." The additional content indicator 610 provides the requesting entity 602 with proactive content relevant to the query 604. That is, in addition to directly answering the query 604, the architecture 110 determines and makes available additional related content.

FIG. 7 continues the example in FIG. 6, and illustrates an additional content exchange 700. In particular, the additional content exchange 700 occurs when the requesting entity 602 issues an affirmative response 702 to the additional content indicator 610. Note that in this example, the affirmative response 702 is a voice response that NLP in the architecture identifies as requesting delivery of the additional content. In other cases, the affirmative response may be a touch on a designated touchscreen area, a button press, mouse click, a gesture, an action in a simulated physical presence environment, such as a VR/AR environment, or other response.

The additional content is: "Company Z has launched a directly competing product K with rapid sales growth of 34%. Social media discussions indicate a direct comparison between product A and product K." Note the architecture 110 has located relevant information about specific competitors and products, as well as relevant product mentions in social media. The RSA 340 packages this additional relevant information and delivers it to the requesting entity as the additional content 704, e.g. in voice form.

FIG. 8 shows example processing 800 performed by the architecture on a natural language query 604 to arrive at the query response 608. The example in FIG. 8 identifies six specific response elements, numbered 1, 2, 3, 4, 5, and 6. Each response element is described below.

The QPA 338 detects that the query 604 explicitly names the product A and the geographical region X. For response element 1, the word "sales" in the query 604 triggers the QPA 338 to search for sales metrics for the product and in the geographical region. The RSA 340 applied a seasonal adjustment "during the last 3 months" based on the actual data located in the data storage layer 302, and used "Although" to contrast a drop in sales to the season-adjusted sales.

Note that the system automatically determined the KPIs relevant to the product, and projected the KPIs against the budget, e.g., sales and financial targets, of the querying entity and their team. For response element 2, data elements located in the data storage layer 302 indicate that the end of the fiscal period is approaching and that the querying entity frequently accesses performance against budget data. As such, the RSA 340 includes in the query response 608 a response element that provides a projection: "Based on this rhythm . . . ."

For response element 3, the architecture 110 takes action triggered by competition analysis. In this instance, data elements located in the data storage layer 302 reveal competitors, market shares and products, press reports, and content (e.g., article, news, videos, and social posts) related to competition. With the search results, the RSA 340 includes response element 3 in the query response 608 to convey competitor product and sales data relevant to the product explicitly named in the query 604. The RSA 340 may also include information relevant to implied products, or other products related to the product explicitly named.

For response element 4, the RSA 340 includes relevant social media content. In this case, the architecture 110 is triggered by finding information on a competitive product launch in the data elements in the data storage layer 302. That is, the architecture 110 has acquired social feeds to capture related social discussions across major social media platforms.

With regard to response element 5, the RSA 340 includes additional social media content. In this instance, given the significant presence in social media feeds, the architecture 110 executes a sentiment analysis engine to compare what is being said for the two products A and K. The RSA 340 synthesizes the results as part of the query response 608.

The response element 6 provides an example of a content FRE. The RSA 340 has synthesized competitor activity information into the query response 608. That is, the RSA 340 has taken further response synthesis action, triggered by the competitor activity, by incorporating scanned content from major media sites, in reference to the new product by the competitor. In that respect, the RSA 340 can provide an automatically compiled summary of the articles and/or entry points 802 (e.g., hyperlinks) to the actual content.

Figure 9:
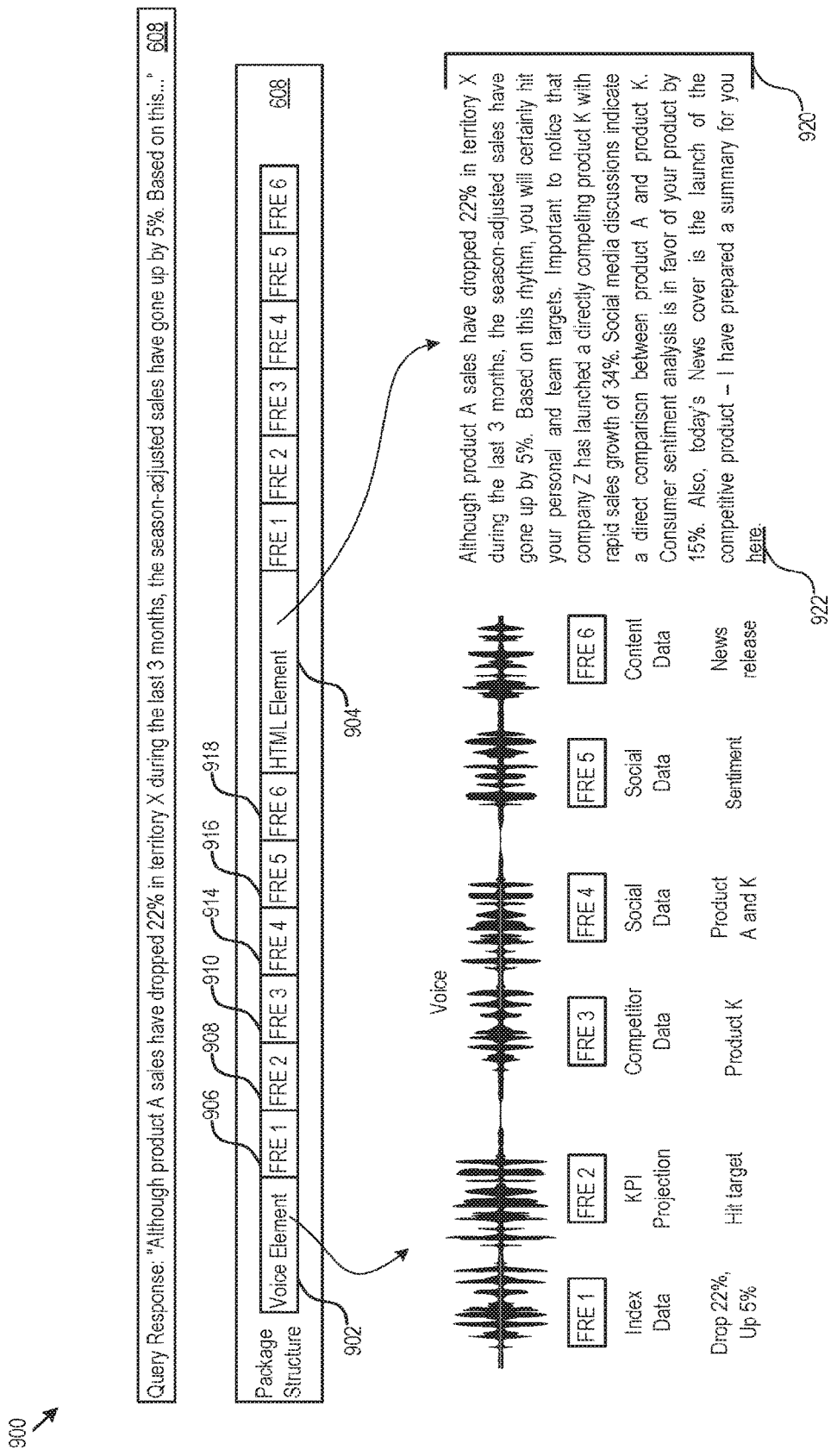
FIG. 9 shows an example package structure.

FIG. 9 shows an example package structure 900 for the query response 608. In this example, the package structure 900 specifies a voice segment 902 and an HTML segment 904. Note that the voice segment 902 and HTML segment 904 are just two examples. Any particular type or form of segment may be present in the package structure 900 in any sequence and any number. Other examples of segments include VR/AR audio/video streams, ASCII text, documents in any application format (e.g., Word or PowerPoint), Flash, HTML 5 video, and so on.

For the voice element 902, the RSA 340 converts each FRE 906, 908, 910, 912, 914, 916, and 918 into a voice component, e.g., by executing a text-to-speech engine on a sentence formed with each FRE. The RSA 340 may apply additional voice processing as well, including audio processing that adjusts timing, rhythm, style, emphasis, voice type (e.g., male, female, robotic) of the voice components, audio processing that connects or smooths connections between voice components, or any other type of audio processing.

The HTML component 904 delivers an enriched displayable version of the FREs 906-918 to the query source. The HTML component 904 may define web pages, text elements, hyperlinks, images, and any other content types defined within HTML. In FIG. 9, the HTML component 904 includes the text components, e.g., the sentences 920 formed with each FRE. The example HTML component 904 also includes the hyperlink 922 that directs to another information source, in this case news regarding a competitive product.

Additional Examples of QPA and RSA Processing

Figure 10:
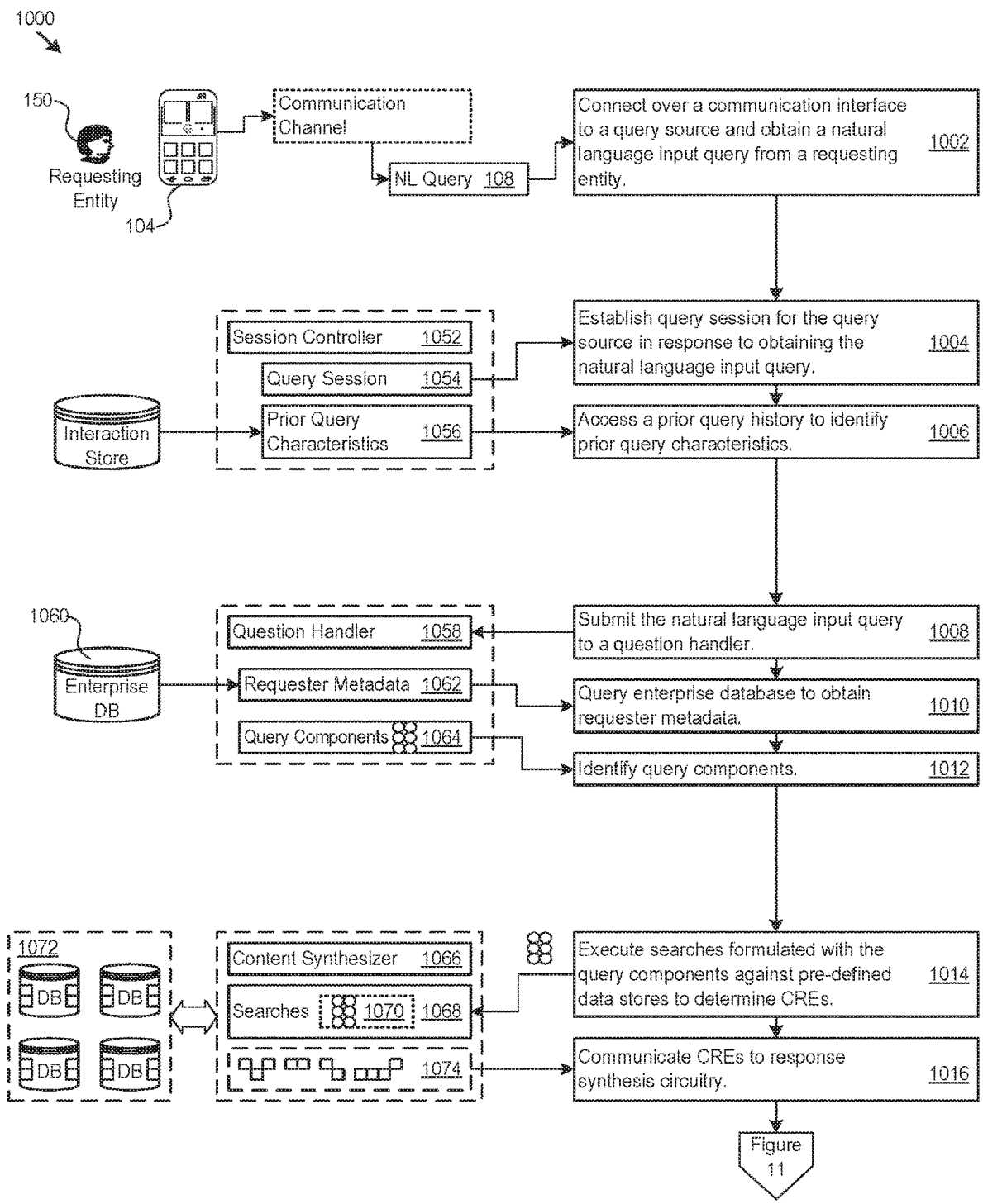
FIG. 10 shows logic that the architecture may implement for query pre-processing.

The architecture 110 may be implemented in many different ways and execute different variations of the processing noted above. FIG. 10 shows another example of the processing logic 1000 that the architecture 110 may implement for query pre-processing. As shown in FIG. 10, the architecture 110 connects over a communication channel 1050 to a query source and obtains a natural language input query 108 from a requesting entity 150 (1002). With a session controller 1052 that is part of query pre-processing circuitry, the architecture 110: establishes a query session 1054 for the query source in response to obtaining the natural language input query 108 (1004), accesses a prior query history 1056 to identify prior query characteristics 1056 (1006), and submits the natural language input query 108 to a question handler 1058 (1008).

The question handler 1058 is configured to query an enterprise database 1060 for an enterprise linked to the requesting entity, to obtain requester metadata 1062 that identifies characteristics of the requesting entity 150 (1010). The question handler 1058 further identifies query components 1064 (1012), such as an explicit entity that is explicitly included in the natural language input query, an implicit entity implied but not explicitly included in the natural language input query, selected characteristics of the prior query characteristics, and selected characteristics of the requesting entity in the requester metadata.

A content synthesizer 1066 executes searches 1068 formulated with the query components 1070 against pre-defined data stores 1072. The content synthesizer 1066 thereby determines CREs 1074 (1014). The content synthesizer 1066 communicates the CREs 1074 to response synthesis circuitry. In some implementations, the content synthesizer 1066 may apply filters (e.g., the dimensional filters described above) to select a subset of the CREs to provide to the response synthesis circuitry.

Figure 11:
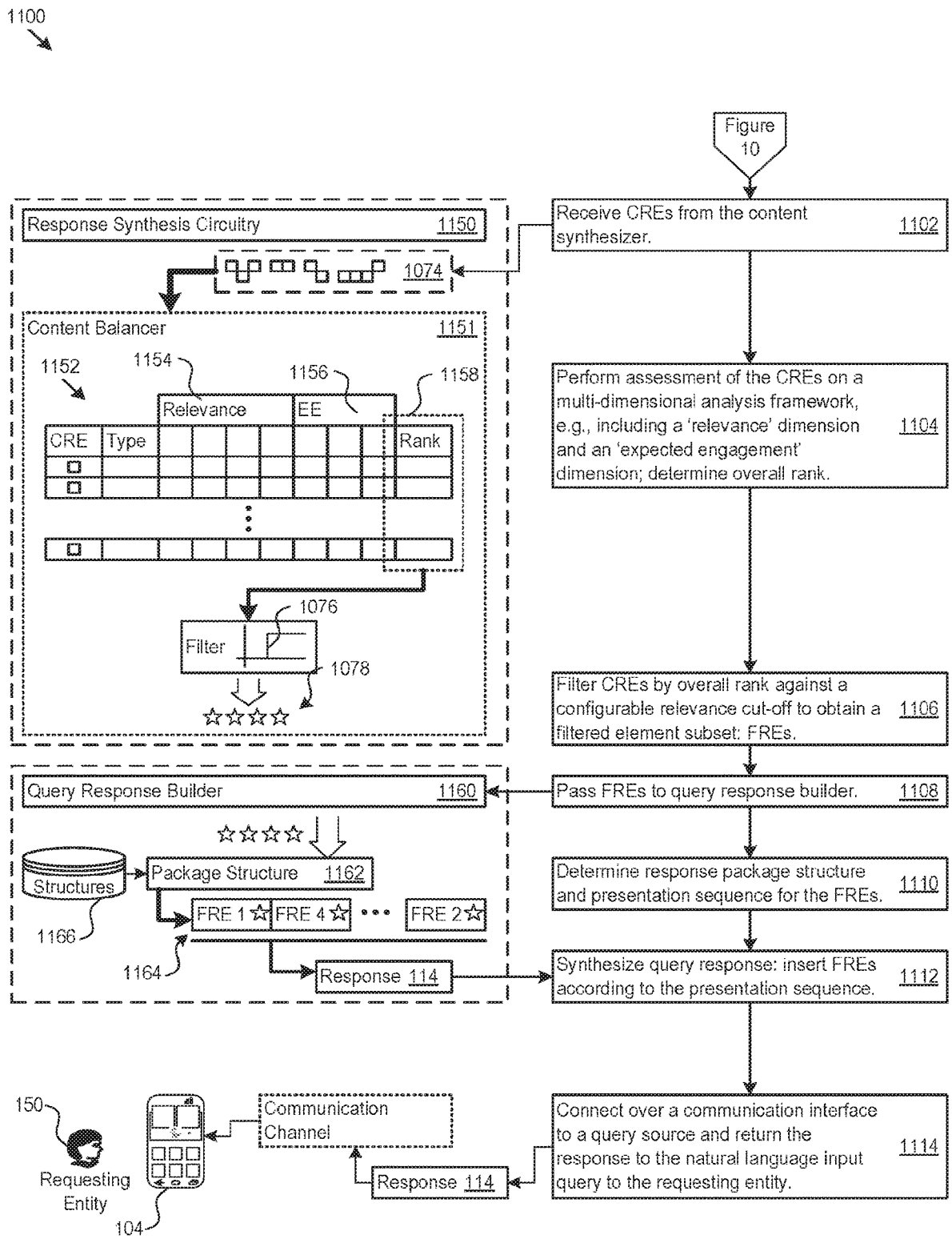
FIG. 11 shows logic that the architecture may implement for response synthesis.

The example begun in FIG. 10 continues with FIG. 11. FIG. 11 shows an example of the processing logic 1100 that the architecture 110 may implement for response synthesis. The response synthesis circuitry 1150 receives CREs 1074 from the content synthesizer 1066 (1102). The response synthesis circuitry 1150, e.g., using a content balancer 1151, performs assessments of the CREs 1074 on a multi-dimensional analysis framework 1152 (1104).

In one implementation, the multi-dimensional analysis framework includes a 'relevance' dimension 1154 and an 'expected engagement' dimension 1156 for determining an overall rank 1158. The content balancer 1151 evaluate a function of the assessments on the 'relevance' dimension and the 'expected engagement' dimensions to obtain the overall rank 1158 for each of the CREs 1074. The content balancer 1151 also filters the CREs by their overall rankings against a configurable relevance cut-off 1076 to obtain a filtered element subset: the FREs 1078 (1106).

The FREs 1078 pass to a query response builder 1160 (1108). The query response builder 1160 determines a query response package structure 1162 and determines, e.g., as specified in the query response package structure 1162, a presentation sequence 1164 for the FREs 1078 (1110). The query response builder 1160 may determine the query response package structure 1162 in many ways, including by searching a package structure library 1166 according to characteristics of the query source, the requesting entity, or the communication channel type; in response to pre-defined preferences for the requesting entity; responsive to feedback provided during the query session 1054 or prior query sessions; or in other ways.

The query response builder 1160 orders the FREs 1078 according to the presentation sequence 1164 and generates content elements for the query response according to the query response package structure 1162. The content elements may include audio, video, text, HTML, VR or other type of content element. In that respect, the query response builder may, if needed, perform format conversion by executing conversion engines. As just two examples, the query response builder 1160 may execute a text-to-speech engine to convert a text-based filtered response element to an audio content element, or wrap an audio filtered response element in a video container to generate video from audio.

The query response builder 1160 thereby synthesizes a query response 114 to the natural language input query 108 (1112). Note that the package structure may specify content options in addition to or instead of response sequence. Examples of content options include content element data type, e.g., voice, video, HTML, or other content element types; overall length of the query response; length requirements or preferences for any given FRE in the presentation sequence 1164; and other content options. The query response builder 1160 transmits the query response 114 to the query source, e.g., via the session controller 1052 and the communication channel (1114).

Figure 12:
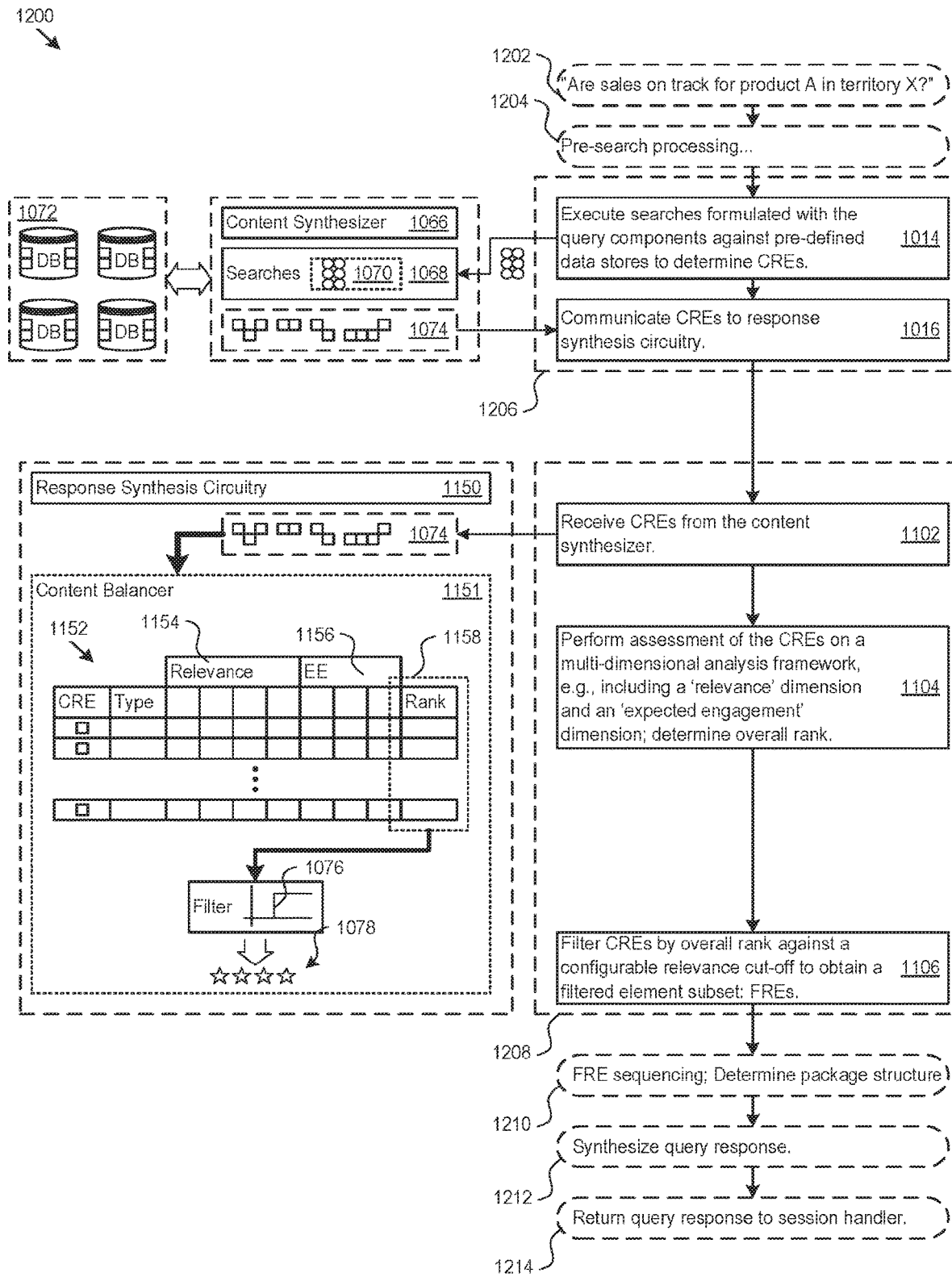
FIG. 12 shows logic that the architecture may implement for determining which content elements to include in a query response.

FIG. 12 shows logic 1200 that the architecture may implement for determining which content elements to include in a query response. FIG. 12 focuses on specific parts of the processing logic described above in FIGS. 10 and 11. FIG. 12 highlights discovering CREs via the content synthesizer 1066 and then analysis of the CREs to select the FREs by the content balancer 1151. The discussion below of FIG. 12 continues the example of FIG. 6, with reference to the example multi-dimensional analysis framework 1300 illustrated in FIG. 13 and FIG. 14.

In this example, the QPA receives the natural language input query: "Are sales on track for product A in territory X?" (1202). As noted above, pre-search processing occurs, e.g., to establish a query session and determine query components (1204). As a result of the searches performed by the content synthesizer 1066, the QPA arrives at a set of CREs 1074 (1206). The QPA may filter the set of CREs to eliminate CREs from consideration, according to pre-defined dimensional filters as noted above. The remaining CREs pass to the RSA for further analysis and filtering, along with dimensional metrics, to determine FREs (1208).

FIG. 13 shows an example set of CREs with dimensional metrics in a multi-dimensional analysis framework ("framework") 1300. The CREs were chosen for discussion purposes from a larger set returned in the searching, shown below in Table: CREs.

TABLE

| | | Relevance | | | | Expected Engagement | | | |
|---|---|---|---|---|---|---|---|---|---|
| CRE | Type.subtype | Question | User | Time & Fiscal | Adj. | Internal | External | Adj. | Rank |
| BBC: mentioned in the news | Content.News. Mention | 0.75 | 0.99 | 0.18 | 0.86 | 0.81 | 0.70 | 0.76 | 0.81 |

TABLE-continued

| | | CREs | | | | | | | |
| | | Relevance | | | | Expected Engagement | | | |
| CRE | Type.subtype | Question | User | Time & Fiscal | Adj. | Internal | External | Adj. | Rank |
| --- | --- | --- | --- | --- | --- | --- | --- | --- | --- |
| Sales Volume Trend, Broken by product | Data.KPI | 0.92 | 0.86 | 0.75 | 0.86 | 0.72 | 0.54 | 0.63 | 0.75 |
| Customer Satisfaction trend | Data.TimeSeries | 0.41 | 0.95 | 0.90 | 0.84 | 0.68 | 0.97 | 0.83 | 0.83 |
| Competitor's related patent being published | Content.News.Patent | 0.79 | 0.93 | 0.11 | 0.82 | 0.42 | 0.37 | 0.40 | 0.61 |
| Product Quality Index | Data.KPI | 0.47 | 0.92 | 0.19 | 0.76 | 0.32 | 0.55 | 0.44 | 0.60 |
| MIT: Research on a new technology | Content.News | 0.05 | 0.85 | 0.32 | 0.64 | 0.65 | 0.24 | 0.45 | 0.54 |
| Facebook: Competitor A product release | Content.News | 0.64 | 0.60 | 0.86 | 0.63 | 0.80 | 0.23 | 0.52 | 0.57 |
| Wired: New patent released by competitor X | Content.News.Tech | 0.91 | 0.60 | 0.30 | 0.63 | 0.62 | 0.70 | 0.66 | 0.65 |
| Team targets | Data.Business.Activity | 0.34 | 0.69 | 0.43 | 0.59 | 1.00 | 0.32 | 0.66 | 0.63 |
| Market share | Data.KPI | 0.99 | 0.42 | 0.89 | 0.58 | 0.63 | 0.49 | 0.56 | 0.57 |
| BBC: Product X released today | Content.News | 0.19 | 0.75 | 0.03 | 0.57 | 0.80 | 0.57 | 0.69 | 0.63 |
| Team budget (targets/goals & objectives) | Data.Business.Activity | 0.97 | 0.25 | 0.91 | 0.46 | 0.44 | 0.82 | 0.63 | 0.55 |
| Twitter trends on competitive product | Social.Signals | 0.37 | 0.42 | 0.83 | 0.45 | 0.59 | 0.81 | 0.70 | 0.58 |
| Sales Volume trend for the particular territory | Data.TimeSeries | 0.63 | 0.35 | 0.50 | 0.42 | 0.24 | 0.39 | 0.32 | 0.37 |
| Competitor's financial results | Content.Financials | 0.74 | 0.26 | 0.88 | 0.42 | 0.53 | 0.11 | 0.32 | 0.37 |
| Corporate profitability | Data.KPI | 0.61 | 0.31 | 0.39 | 0.38 | 0.52 | 0.35 | 0.44 | 0.41 |
| Product Profitability | Data.KPI | 0.29 | 0.31 | 0.88 | 0.36 | 0.55 | 0.88 | 0.72 | 0.54 |
| MIT Competitor files new patent on a related tech | Content.News.Patent | 0.57 | 0.12 | 0.68 | 0.27 | 0.68 | 0.84 | 0.76 | 0.51 |
| Twitter trends on related technology research | Social.Signals | 0.18 | 0.20 | 0.68 | 0.24 | 0.66 | 0.96 | 0.81 | 0.53 |
| Product complaints ratio | Data.KPI | 0.19 | 0.18 | 0.37 | 0.20 | 0.17 | 0.76 | 0.47 | 0.33 |

TABLE-continued

| | | CREs | | | | | | | |
|---|---|---|---|---|---|---|---|---|---|
| | | Relevance | | | | Expected Engagement | | | |
| CRE | Type.subtype | Question | User | Time & Fiscal | Adj. | Internal | External | Adj. | Rank |
| CNN: Company's Financial Review | Content.Financials | 0.18 | 0.17 | 0.15 | 0.17 | 0.44 | 0.00 | 0.22 | 0.20 |
| Release cycle effectiveness | Data.KPI | 0.70 | 0.00 | 0.07 | 0.15 | 0.59 | 0.39 | 0.49 | 0.32 |
| Corporate revenue | Data.KPI | 0.20 | 0.02 | 0.35 | 0.09 | 0.25 | 0.92 | 0.59 | 0.34 |

In particular, the framework 1300 in FIG. 13 includes a 'relevance' dimension 1302 that gauges how closely the CREs apply to the input query, and an 'expected engagement' dimension 1304 that gauges how well the CREs will capture the attention of the requesting entity. In other implementations, the system may determine additional, fewer, or different dimensions for the analysis framework to determine FREs from CREs.

The architecture 110 determines an overall rank 1306 for each CRE in the set of CREs 1309, as described in detail below. In the framework 1300, a type and subtype field 1310 indicates the particular content type and subtype of each CRE. FIG. 13 shows, as examples, quantitative Data type CREs, of sub-type KPI and time series data; and Content type CREs, such as sub-type News, Patent, Tech, and other sub-types.

In one implementation, the 'relevance' dimension 1302 is characterized by an adjusted relevance score 1312. Similarly, the 'expected engagement' dimension 1304 is characterized by an adjusted engagement score 1314. Each of these adjusted scores may reflect, according to pre-determined relationships, the combined effect of sub-dimensional evaluation components. In FIG. 13, the example evaluation components for the 'relevance' dimension 1302 include a 'question relevance' component 1316, which measures how closely related the CRE is to the input query; a 'user relevance' component 1318, which measures how closely related the CRE is to the requesting entity; and a 'time and fiscal relevance' component 1320, which measures how closely related the CRE is to the current timing (e.g., in absolute terms, which could be used to refer to relevant facts and events) and enterprise timing (e.g., fiscal year and related fiscal year events). Described another way, the components 1316, 1318, and 1320 are partial relevance scores that contribute to the 'relevance' dimension 1302.

Figure 15:
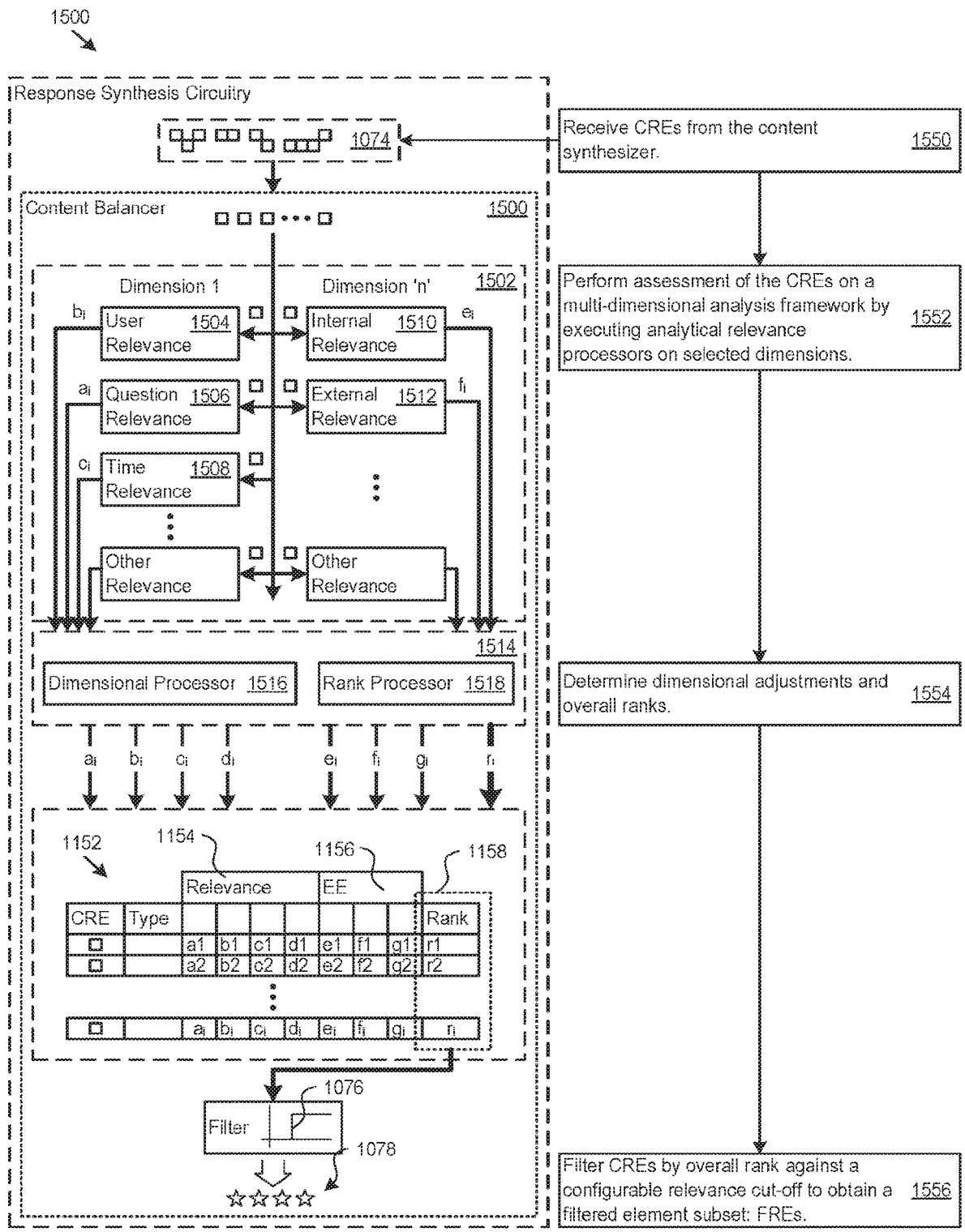
FIG. 15 shows purpose-specific analytical relevance processors in the architecture.

In some implementations, the content balancer receives the CREs (1550) and executes purpose-specific analytical relevance processors preconfigured to determine the relevance component scores along any selected dimensions that the architecture 110 may take into consideration (1552). FIG. 15 shows an example content balancer 1500 with specific relevance processors 1502. In this example, the specific relevance processors 1502 for the 'relevance' dimension 1302 include a user relevance processor 1504, a question relevance processor 1506, and a time relevance processor 1508. The specific relevance processors 1502 for the 'expected engagement' dimension 1304 include the internal relevance processor 1510 and the external relevance processor 1512.

The example evaluation components for the 'expected engagement' dimension 1304 include an 'internal engagement' component 1322, which reflects the expected level of engagement of the CRE inside the enterprise, based on history data and levels of engagement of similar CREs in terms of type, format, topics, structure, length and other criteria. The 'internal engagement' component 1322 may include and add additional weight to the engagement level with the particular querying entity. The 'expected engagement' dimension 1304 also includes an 'external engagement' component 1324, which measures the expected level of engagement of the CRE based on data outside the enterprise. Both sub-dimensional evaluation components of 'expected engagement' are independent of the particular input query. Described another way, the components 1322 and 1324 are partial engagement scores that contribute to the 'expected engagement' dimension 1304, which is then used in an attempt to not only serve the querying entity with relevant content, but also optimize the level of engagement.

For internal expected engagement levels, the architecture 110 may capture each interaction and its characteristics within the enterprise. Such characteristics include, as examples, details regarding the input query, the query response, the session length, querying device, and the content and type of CREs and FREs. That is, engagement metrics such as time spent, number, type, and content of follow-up questions, frequency of use, explicit feedback, share actions, and the like are used in view of the historical data within the enterprise. This type of analysis permits the architecture 110 to analyze and predict engagement levels given: [a] properties of the content and type of CRE and FRE, [b] the device involved in the current session, and [c] the time of the day/day of the week, among other factors. For external expected engagement levels, the architecture 110 uses the public metadata collected, regarding public and social content, in order to estimate the engagement level outside the corporation in the public domain. As examples, the architecture may analyze the number of 'likes', 'shares', or 'mentions', as well as trending indicators, buzz, and other signals across multiple different source media sources.

The user relevance processor 1504 determines characteristics of the querying entity in terms of, e.g., content, data, and information preferences. These preferences may be explicitly set by the querying entity or implicitly derived by the architecture 110. The understanding of the querying entity may result from modeling system usage patterns, types of queries presented, query time frame, engagement level, and other aspects of the querying entity and its interaction with the architecture 110. Given the understanding of the querying entity, the user relevance processor 1504 determines relevance and expected engagement to querying entity for any given CRE, as reflected in the user relevance' component 1318 (denoted 'b$_i$') in FIG. 15.

The question relevance processor 1506 determines the 'question relevance' component 1316 (denoted 'a$_i$' in FIG. 15) and executes based on the fact that any CRE may be directly or indirectly relevant to the particular query. The question relevance processor 1506 quantifies the relevance of a CRE to queries including the current input query and correlated queries that have been determined. The question relevance processor 1506 may, for instance, match the context of the question (supported by the overall session) with the context derived from the CRE. The question relevance processor 1506 may also analyze timing, for instance: a query concerns laptop X performance, and while there is an article for laptop X with apparently good match, the article is very old and thus the overall relevance to the query is small.

The time relevance processor 1508 determines the 'time and fiscal relevance' component 1320, denoted 'c$_i$' in FIG. 15. In that respect, time relevance processor 1508 recognizes that different types of CREs better apply to different situations within the fiscal year of the enterprise, or with respect to an absolute timeline. The time relevance processor 1508 quantifies the time relevance in reference to [a] the time the query was asked, [b] the time referenced in the query, [c] the time implied by the query [d], and any reference time autonomously set by the architecture 110 as part of the response.

As one example, given a question regarding operational results submitted around the start of the fiscal year (for the particular enterprise), the most recent balance sheet will probably be more relevant than it would be in the middle of the year. The same question in the middle of the year, might be better served with predictions, however, and therefore available prediction CREs are scored higher by the time relevance processor 1508. As another example, if the query is about predictions, or the system has decided include predictions about some figures (for instance, sales of product x), then the time relevance processor 1508 will assign CREs with content describing a competitor product release or other major event which is aligned with the prediction timeline a higher score.

In similar manner, the content balancer 1500 executes the internal relevance processor 1510 to determine the 'internal engagement' component 1322, denoted 'e$_i$' in FIG. 15, and executes the external relevance processor 1512 to determine the 'external engagement' component 1324, denoted 'f$_i$' in FIG. 15. The architecture 110 adjusts individual component values and determines overall scores (1554). As shown in FIG. 15, post-processing circuitry 1514 executes a dimensional processor 1516 to determine adjustments, and a rank processor 1518 to determine overall rank. Several examples of the logic implemented in the dimensional processor 1516 and the rank processor 1518 are given next, and lead to filtering the CREs by overall rank to determine the FREs (1556).

Sub-dimensional evaluation components contribute to their corresponding dimensions in many different ways in many different implementations. As one example, the content synthesizer 346 may determine the components (e.g., 1316-1320 and 1322-1324) in the range [0, 1], and the content synthesizer 346 or content balancer 358 may determine the adjusted relevance score (ARS) 1312 (also denoted 'd$_i$' in FIG. 15) and the adjusted engagement score (AES) 1314 (also denoted 'g$_i$' in FIG. 15) according to:

$$ARS = \sum_{i=1}^{n} rb_i * r_i$$

$$AES = \sum_{j=1}^{m} eb_j * e_j$$

where $r_i$ is the partial relevance score for relevance component i;

$e_j$ is the partial engagement score for engagement component j; and $rb_i$ and $eb_j$ are configurable weighting factors for relevance balance and engagement balance.

One example of the weighting factors for relevance is shown below in Table: Relevance Balancer.

TABLE

| Relevance Balancer | |
| --- | --- |
| Weight | Value |
| Question, $rb_1$ | 0.2 |
| User, $rb_2$ | 0.7 |
| Time & Fiscal, $rb_3$ | 0.1 |

One example of the weighting factors for engagement is shown below in Table: Engagement Balancer.

TABLE

| Engagement Balancer | |
| --- | --- |
| Weight | Value |
| External, $eb_1$ | 0.5 |
| Internal, $eb_2$ | 0.5 |

More generally, the content balancer 358 provides the flexibility to the administrator of the architecture 110 to set the balance between CREs according to many different factors, including probability of engagement specifically within the enterprise and externally to the enterprise. With respect to the weights noted above, if $eb_1$=1 then the content balancer 358 may only consider externally (potentially) popular content, while if $eb_2$=1, the content balancer 358 will only consider internally (potentially) popular content. Intermediate values of $eb_1$ and $eb_2$ will strike a balance between the two extremes.

The content balancer 358 may further perform balance according to defined rulesets. For instance, different parameter values maybe assigned to different time intervals (e.g., non-working hours), days (e.g., weekdays versus weekends versus public holidays). This facilitates additional capabilities for personalization. For example, a business user asking the same question during a weekend from home, may then be served with more socially trending content versus a 'from office, workdays' scenario where the synthesis is more corporate driven.

The contribution of the expected engagement in the overall ranking is further controlled via the $RE_1$ and $RE_2$ weights (see below). These content balancer 358 may also control these weights according to defined rulesets. As one example rule: if the query is received during working hours, then focus on relevance by setting a low weighting factor for $RE_2$, else if the query is received during a weekend, then optimize for engagement by setting a relatively higher value for $RE_2$.

There are many different ways to implement relevance components and dimensional metrics. In the example discussed above with respect to FIG. 3, a distinction was made between search engines tailored to the specific types of data elements in the data storage layer 302. Those search engines included a data index search engine 350, a content search engine 352, a social signals search engine 354, and a product search engine 356. Accordingly, the content synthesizer 346 may tag CREs according to the content type by which search engine found the CRE, e.g., as a data CRE, a social CRE, a content CRE, or a product CRE. Another implementation option is to assign a weight for each content type of CRE, and combine the scores for each CRE according to the individual content type weights. One such example is shown below in Table: synthesis Balancer.

TABLE

Synthesis Balancer

| Type | Weight |
| --- | --- |
| Data | $sb_1$ |
| Social | $sb_2$ |
| Content | $sb_3$ |
| Competition or Industry | $sb_4$ |

All of the weighting factors are configurable and may be fixed, or may vary widely and dynamically, e.g., responsive to closed loop feedback. In that sense, as just one example, a requesting entity may provide feedback indicating a preference for question relevant content, and the system may respond by increasing the weighting factor for $rb_1$ and decreasing the other weighting factors.

The content synthesizer 1066 or content balancer 1151 may determine in many different ways the overall rank ("OR") 1308 (also designated as '$r_n$' in FIG. 15) as a function of the dimensional components, in this example the 'relevance dimension' 1302 and 'expected engagement dimension' 1304. As one example:

$$OR = RE_1 * \sum_{i=1}^{n} rb_i * r_i + RE_2 * \sum_{j=1}^{m} eb_j * e_j$$
$$= RE_1 * ARS + RE_2 * AES$$

One example of the weighting factors $RE_1$, $RE_2$ for the overall rank 1308 is shown below in Table: Dimensional Balancer.

TABLE

Dimensional Balancer

| Weight | Value |
| --- | --- |
| Relevance, $RE_1$ | 0.5 |
| Engagement, $RE_2$ | 0.5 |

Figure 14:
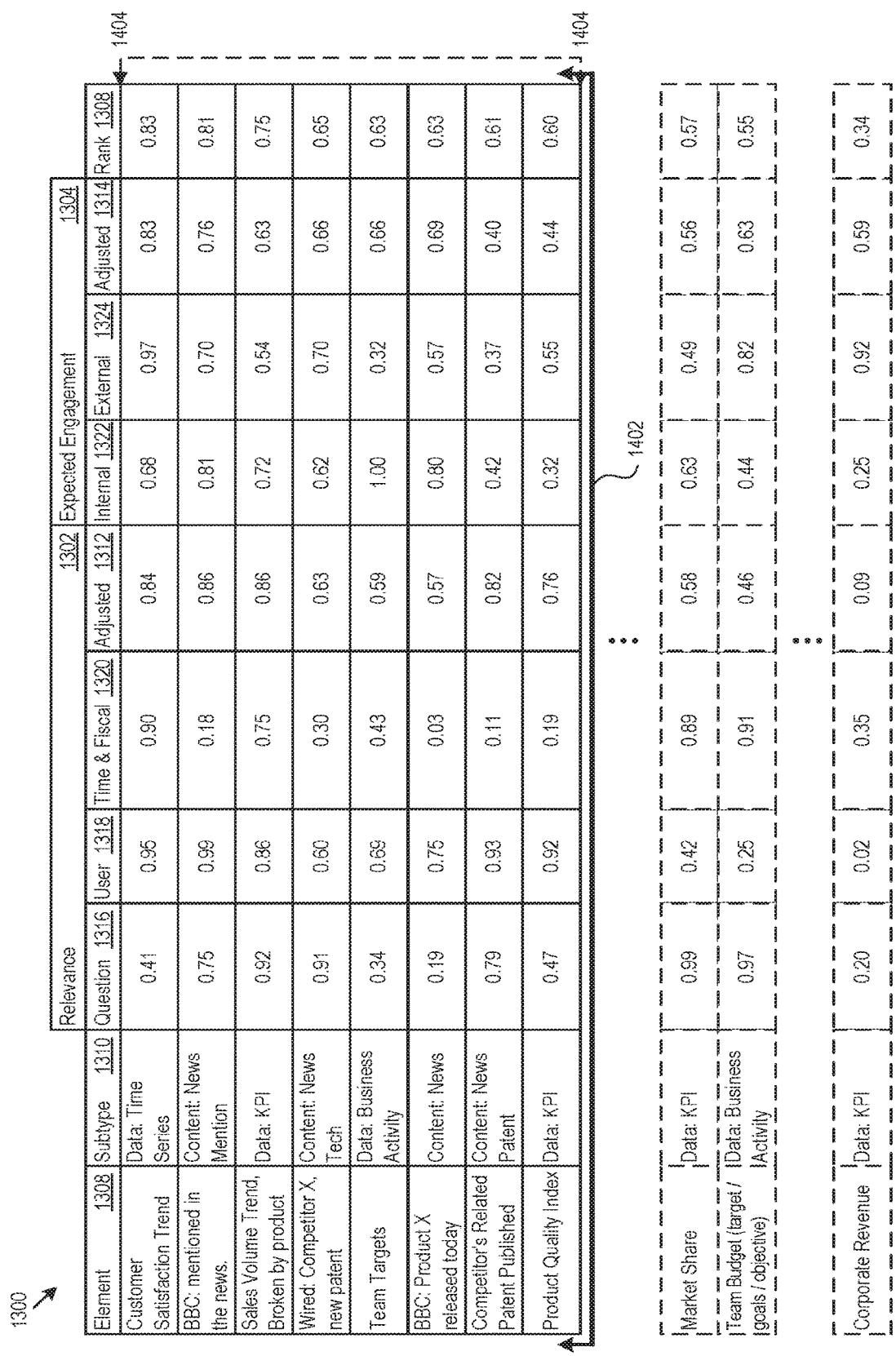
FIG. 14 continues the example of FIG. 13.

FIG. 14 shows the result of the content balancer 1151 applying a configurable relevance cut-off 1402. The content balancer 1151 filters the CREs by overall rank 1308 against the configurable relevance cut-off 1402 (in this particular example 0.60). Those CREs that pass the filter are present in the filtered element subset, the FREs 1404. The content balancer 1151 rejects those CREs that do not pass the filter, and they are not considered further in synthesizing the actual query response.

Continuing the example in FIG. 12, given the FREs 1404, the response synthesis circuitry 1150 determines FRE sequencing and the overall package structure (1210). The response synthesis circuitry 1150 may then actually synthesize the query response (1212). Query responses return to the querying entity through the session handler or other return mechanism (1214).

The methods, devices, architectures, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible. For instance, any of the components and functionality in the architecture 110 may be hosted in virtual machines managed by a cloud services provider. That is, while some implementations may be completely localized within a given enterprise, other implementations are completely migrated into the cloud, or are hybrid implementations with mixed local and cloud implementation. Regarding querying devices, the smartphones applications and desktop computers noted above are just particular examples, and other querying devices may be used, including hands-free systems in vehicles, digital personal assistants in smartphones or desktop PCs, hands-free control systems for the home, and many other types of devices.

What is claimed is:

1. A method comprising:
in a query processing hardware system:
obtaining a natural language input query from a query source over a communication interface;
with a query pre-processing architecture circuitry:
submitting the natural language input query to a question handler;
predicting, based on the natural language input query and metadata characterizing the query source, an additional anticipated specific follow on question from the query source;
generating a set of queries that include the natural language input query and the additional anticipated specific follow on question;
determining query components from the set of queries that include the natural language input query and the additional anticipated specific follow on question;
executing searches based on the query components against pre-defined data stores to determine candidate response elements; and
communicating the candidate response elements to a response synthesizer;
with the response synthesizer:
synthesizing a query response to the natural language input query that includes a proactive response to the additional anticipated specific follow on question based on the candidate response elements; and
transmitting the query response and the proactive response for receipt by the query source.

2. The method of claim 1, where:
determining query components comprises determining an entity explicitly included in the natural language input query, an entity implied but not explicitly included in the natural language input query, or both types of entities.

3. The method of claim 1, where:
determining query components comprises determining a requesting entity who has posed the natural language input query; and
responsive to determining the requesting entity, obtaining requester metadata that characterizes the requesting entity.

4. The method of claim 3, where:
obtaining requester metadata comprises querying an enterprise database for any combination of one or more of:
a requesting entity role;
a requesting entity query history with the query processing hardware system; and
a requesting entity enterprise activity.

5. The method of claim 1, where:
the query response is a query response package comprising multiple output types, and the method further comprises arranging a package structure according to an element sequence specified with the package structure based on the query source.

6. The method of claim 5, where:
the multiple output types include any combination of one or more of:

text output;
hypertext output;
voice output;
interactive visualization output;
video output; and
simulated physical presence output.

7. The method of claim 1, further comprising:
determining a recommended action in addition to the candidate response elements; and
adding the recommended action into the query response for delivery to the query source.

8. The method of claim 1, further comprising:
ranking the candidate response elements according to relevance; and
filtering the candidate response elements with a configurable relevance cut-off to obtain a selected element subset of filtered candidate response elements.

9. The method of claim 8, where:
ranking comprises:
determining measures of the candidate response elements on a multi-dimensional analysis framework, the multi-dimensional analysis framework comprising a 'relevance' dimension and an 'expected engagement' dimension; and
evaluating a function of the measures on the 'relevance' dimension and the 'expected engagement' dimension to obtain an overall rank for each of the candidate response elements.

10. The method of claim 1, further comprising:
establishing a query session for the query source with a session controller in response to obtaining the natural language input query.

11. The method of claim 1, where:
the pre-defined data stores comprise an internal product data store with respect to a pre-defined enterprise that hosts the query processing hardware system; and where:
executing searches against the pre-defined data stores comprises:
executing the searches against the internal product data store to discover candidate response elements regarding a particular enterprise product.

12. The method of claim 1, further comprising:
determining a selected element subset of the candidate response elements;
determining an element sequence for the candidate response elements in the selected element subset;
determining a query response package structure; and
ordering the candidate response elements in the selected element subset according to the element sequence and the query response package structure to synthesize the query response to the natural language input query.

13. The method of claim 1, where:
synthesizing includes:
applying pre-determined weightings to the candidate response elements.

14. The method of claim 1, where:
the pre-defined data stores comprise an internal user data store with respect to a pre-defined enterprise that hosts the query processing hardware system; and where:
executing searches against the pre-defined data stores comprises:
executing the searches against the internal user data store to discover candidate response elements regarding a particular enterprise individual.

15. The method of claim 1, where:
the pre-defined data stores comprise an external data store with respect to a pre-defined enterprise that hosts the query processing hardware system; and where:
executing searches against the pre-defined data stores comprises:
executing the searches against the external data store to determine the candidate response elements.

16. A natural language query processing system comprising:
communication interface circuitry configured to connect to a query source and obtain a natural language input query;
query pre-processing circuitry configured to:
establish a query session for the query source with a session controller in response to obtaining the natural language input query;
predict, based on the natural language input query and metadata characterizing the query source, an additional specific question from the query source;
submit the natural language input query and the additional specific question as a query set to a question handler configured to determine query components from the query set containing the natural language input query and the additional specific question;
execute searches based on the query components against pre-defined data stores to determine candidate response elements; and
communicate the candidate response elements to response synthesis circuitry; and
the response synthesis circuitry configured to:
determine a selected element subset of the candidate response elements;
determine an element sequence for the candidate response elements in the selected element subset;
determine a query response package structure;
order the candidate response elements in the selected element subset according to the element sequence and the query response package structure to synthesize a query response to the natural language input query and the additional specific question; and
deliver the query response through the session controller to the query source via the communication interface circuitry.

17. The system of claim 16, where:
the query components comprise:
an entity explicitly included in the natural language input query;
an entity implied but not explicitly included in the natural language input query; or both types of entities.

18. The system of claim 16, where:
query pre-processing circuitry is further configured to:
determine a requesting entity that has posed the natural language input query; and
responsive to determining the requesting entity, obtain requester metadata that characterizes the requesting entity.

19. The system of claim 18, where:
query pre-processing circuitry is further configured to:
obtain the requester metadata by querying an enterprise database for any combination of one or more of:
a requesting entity role;
a requesting entity query history with the natural language query processing system; and
a requesting entity enterprise activity.

20. The system of claim 16, where:
the query response package structure comprises multiple output types arranged according to the element sequence.

21. The system of claim 20, where:
the multiple output types include any combination of one or more of:
text output;
hypertext output;
voice output;
interactive visualization output;
video output; or
simulated physical presence output.

22. The system of claim 16, where:
the response synthesis circuitry is further configured to:
determine a recommended action in addition to the candidate response elements; and
add the recommended action into the query response for delivery to the query source.

23. The system of claim 16, where:
the response synthesis circuitry is further configured to:
determine an overall rank for the candidate response elements according to relevance; and
filter the candidate response elements by their overall rankings against a configurable relevance cut-off to obtain the selected element subset.

24. The system of claim 23, where:
the response synthesis circuitry is further configured to:
perform assessments of the candidate response elements on a multi-dimensional analysis framework comprising a 'relevance' dimension and an 'expected engagement' dimension; and
evaluate a function of the assessments on the 'relevance' dimension and the 'expected engagement' dimension to obtain the overall rank for each of the candidate response elements.

25. A method comprising:
in a query processing hardware system:
establishing a communication channel to a query source;
obtaining a natural language input query from the query source over the communication channel;
passing the natural language input query to query pre-processing circuitry; and
with the query pre-processing circuitry:
establishing a query session for the query source in response to receiving the natural language input query;
predicting, based on the natural language input query and metadata characterizing the query source, an additional specific question from the query source;
generating a set of queries that include the natural language input query and the additional specific question;
determining query components from the set of queries comprising the natural language input query and the additional specific question;
executing searches based on the query components against pre-defined data stores to determine candidate response elements for building a response to the set of queries;
communicating at least some of the candidate response elements to response synthesizer circuitry;
passing a query response back over the communication channel to the query source, the query response responsive to the natural language input query from the query source and the additional specific question; and saving session history for the query session in an interaction data store.

26. A method comprising:

in a query processing hardware system:

with a response synthesizer:

receiving candidate response elements from a query pre-processor, the candidate response elements received in response to receipt of a set of queries, the set of queries comprising a natural language input query received from a requesting entity via a query source and a predicted additional question from the requesting entity, the predicted additional question generated, based on content of the natural language input query, as a predicted forthcoming question from the requesting entity, and the candidate response elements being possible candidates for a query response generated as an answer in response to the set of queries, wherein the predicted additional question is generated by the query pre-processor based on metadata characterizing the query source;

filtering the candidate response elements to determine filtered response elements identified from among the candidate response elements;

determining an element sequence for the filtered response elements;

determining a query response package structure;

ordering the filtered response elements according to the element sequence and the query response package structure; and synthesizing the query response to the natural language input query and synthesizing a proactive response to the predicted additional question, the query response comprising the filtered response elements ordered by the element sequence and composed according to the query response package structure; and communicating the query response to the query pre-processor for communication to the requesting entity.

* * * * *